US010075934B2

United States Patent
Cui et al.

(10) Patent No.: US 10,075,934 B2
(45) Date of Patent: Sep. 11, 2018

(54) POSITIONING METHOD AND APPARATUS

(71) Applicant: Huawei Technologies Co., Ltd., Shenzhen (CN)

(72) Inventors: Jie Cui, Shenzhen (CN); Anjian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 15/267,932

(22) Filed: Sep. 16, 2016

(65) Prior Publication Data

US 2017/0006575 A1 Jan. 5, 2017

Related U.S. Application Data

(63) Continuation of application No. PCT/CN2014/073548, filed on Mar. 17, 2014.

(51) Int. Cl.
*H04W 64/00* (2009.01)
*G01S 5/00* (2006.01)
*G01S 5/02* (2010.01)

(52) U.S. Cl.
CPC ........... *H04W 64/00* (2013.01); *G01S 5/0036* (2013.01); *G01S 5/0081* (2013.01); *G01S 5/0205* (2013.01)

(58) Field of Classification Search
CPC ..... H04W 64/00; G01S 5/0263; G01S 5/0036
See application file for complete search history.

(56) References Cited

U.S. PATENT DOCUMENTS

| 2007/0135134 A1* | 6/2007 | Patrick | G01S 5/0263 455/456.1 |
| 2012/0040696 A1* | 2/2012 | Siomina | G01S 5/0036 455/456.6 |
| 2013/0051317 A1 | 2/2013 | Ji et al. | |
| 2014/0066088 A1 | 3/2014 | Bhattacharya et al. | |
| 2014/0092761 A1* | 4/2014 | Behravan | H04W 24/02 370/252 |
| 2014/0235273 A1 | 8/2014 | Ahn et al. | |

(Continued)

FOREIGN PATENT DOCUMENTS

| CN | 102300310 A | 12/2011 |
| CN | 103404213 A | 11/2013 |

(Continued)

*Primary Examiner* — Myron K Wyche
(74) *Attorney, Agent, or Firm* — Leydig, Voit & Mayer, Ltd.

(57) ABSTRACT

Embodiments of the present disclosure provide a positioning method and apparatus. The positioning method includes: sending, by a serving base station, a terminal side measurement request based on a positioning node reference signal to a target terminal according to configuration information of the positioning node reference signal; performing, by the serving base station, a base station side measurement based on the positioning node reference signal, and obtaining base station side measurement information based on the positioning node reference signal; and then sending terminal side measurement information based on the positioning node reference signal and the base station side measurement information based on the positioning node reference signal to a location server, so that the location server calculates location information of the target terminal.

18 Claims, 14 Drawing Sheets

(56) References Cited

U.S. PATENT DOCUMENTS

2014/0295883 A1 10/2014 Kang et al.
2015/0312840 A1* 10/2015 Kazmi ................ H04W 40/244
                                                     455/456.2
2016/0112983 A1 4/2016 Ji et al.

FOREIGN PATENT DOCUMENTS

WO    WO 2013036060 A1    3/2013
WO    WO 2013048210 A2    4/2013

* cited by examiner

POSITIONING METHOD AND APPARATUS

CROSS-REFERENCE TO RELATED APPLICATION(S)

This application is a continuation of International Application No. PCT/CN2014/073548, filed on Mar. 17, 2014, the disclosure of which is hereby incorporated by reference in its entirety.

TECHNICAL FIELD

Embodiments of the present disclosure relate to the field of communications technologies, and in particular, to a positioning method and apparatus.

BACKGROUND

With continuous development of mobile communications technologies, requirements for positioning services are also increasing. A positioning technology is a technology used to determine a geographic location of a mobile terminal. In a mobile communications network, a location server may obtain location information of a mobile terminal directly or indirectly by using a wireless communications network resource. Currently, standard terminal positioning modes used in long term evolution (LTE) include enhanced cell identity (e-CID) positioning, observed time difference of arrival (OTDOA) positioning, and the like.

The e-CID positioning is mainly to obtain a geographic location of a target terminal through calculation according to an identity (ID) of a cell in which the target terminal is located, a time difference between reception and transmission by the target terminal, a time difference between reception and transmission by a serving base station, and an angle of arrival (AOA) of a signal transmitted by the target terminal and received by the serving base station. The OTDOA positioning is a network-assisted terminal positioning technology. Its implementation process is as follows: After an enhanced serving mobile location center (e-SMLC) on a network side is notified of transmission and reception configurations of a positioning reference signal (PRS) specified by a base station and a mobile terminal, the base station sends a downlink PRS. The mobile terminal receives PRSs from a plurality of positioning base stations, and after identifying a location of a first-arrival path of each PRS, the mobile terminal may obtain a time difference of arrival of the PRSs between different base stations, and then the mobile terminal reports the time difference of arrival of the PRSs between different base stations to the e-SMLC. After receiving the time difference of arrival of the PRSs between different base stations, the e-SMLC multiplies the time difference by a velocity of light through hyperbola model calculation to obtain a difference of distances between the mobile terminal and different base stations. After a difference of distances between the mobile terminal and two base stations is obtained, a positioning hyperbola may be constructed, and an intersecting point between two positioning hyperbolas is a location of the mobile terminal. In this way, the e-SMLC may finally obtain the accurate location of the mobile terminal.

In the foregoing two positioning methods, when a same cell ID is shared by a plurality of base stations (for example, in some areas, some base stations for transmission assistance or small cells are deployed and used for coverage or capacity enhancement, and these small cells have a same cell ID), if positioning is performed according to the e-CID positioning method, poor positioning accuracy is caused finally. In the OTDOA positioning method, a PRS signal sequence is obtained according to a cell ID. Likewise, when a same cell ID is shared by a plurality of base stations, for the mobile terminal, PRSs sent by the plurality of base stations are the same. Therefore, there is also a problem of poor positioning accuracy.

SUMMARY

Embodiments of the present disclosure provide a positioning method and apparatus, which can implement accurate positioning on a terminal in a scenario in which a plurality of positioning nodes shares a same cell identity.

According to a first aspect, an embodiment of the present disclosure provides a positioning method, including:

after receiving a location measurement request sent by a location server, sending, by a serving base station, a terminal side measurement request based on a positioning node reference signal to a target terminal according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information;

receiving, by the serving base station, terminal side measurement information based on the positioning node reference signal and sent by the target terminal;

performing, by the serving base station, a base station side measurement based on the positioning node reference signal, and obtaining base station side measurement information based on the positioning node reference signal; and sending, by the serving base station, the terminal side measurement information based on the positioning node reference signal and the base station side measurement information based on the positioning node reference signal to the location server, so that the location server calculates location information of the target terminal.

According to a second aspect, an embodiment of the present disclosure provides a positioning method, including:

receiving, by a target terminal, a terminal side measurement request that is based on a positioning node reference signal and sent by a positioning apparatus according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information;

performing, by the target terminal according to the terminal side measurement request, a terminal side measurement based on the positioning node reference signal; and sending, by the target terminal, terminal side measurement information based on the positioning node reference signal to the positioning apparatus.

According to a third aspect, an embodiment of the present disclosure provides a positioning method, including:

receiving, by a serving base station of a target terminal, a base station side measurement request that is based on a positioning node reference signal and sent by a location server according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information;

performing, by the serving base station according to the base station side measurement request, a base station side measurement based on the positioning node reference signal; and sending, by the serving base station, base station side measurement information based on the positioning node reference signal to the location server.

According to a fourth aspect, an embodiment of the present disclosure provides a positioning method, including:

sending, by a location server, a base station side measurement request based on a positioning node reference signal to a serving base station of a target terminal according to configuration information of the positioning node reference signal, and sending a terminal side measurement request based on the positioning node reference signal to the target terminal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information;

receiving, by the location server, base station side measurement information based on the positioning node reference signal and sent by the serving base station, and receiving terminal side measurement information based on the positioning node reference signal and sent by the target terminal; and calculating, by the location server, location information of the target terminal according to the base station side measurement information based on the positioning node reference signal and the terminal side measurement information based on the positioning node reference signal.

According to a fifth aspect, an embodiment of the present disclosure provides a positioning method, including:

sending, by a location server, a location measurement request based on a positioning node reference signal in location assistance information to a target terminal, so that the target terminal performs a reference signal time difference (RSTD) measurement based on the positioning node reference signal, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information;

receiving, by the location server, RSTD measurement information based on the positioning node reference signal and sent by the target terminal; and calculating, by the location server, location information of the target terminal according to the RSTD measurement information based on the positioning node reference signal.

According to a sixth aspect, an embodiment of the present disclosure provides a positioning method, including:

receiving, by a target terminal, a location measurement request based on a positioning node reference signal in location assistance information and sent by a location server, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information;

performing, by the target terminal, a reference signal time difference (RSTD) measurement based on the positioning node reference signal; and sending, by the target terminal, RSTD measurement information based on the positioning node reference signal to the location server, so that the location server performs location calculation according to the RSTD measurement information based on the positioning node reference signal.

According to a seventh aspect, an embodiment of the present disclosure provides a positioning method, including:

receiving, by a serving base station, a request sent by a location server for configuration information of a positioning node reference signal; and sending, by the serving base station, configuration information of a positioning node reference signal of a target terminal to the location server, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information.

According to an eighth aspect, an embodiment of the present disclosure provides a base station, including:

a sending module, configured to send, after a location measurement request sent by a location server is received, a terminal side measurement request based on a positioning node reference signal to a target terminal according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information;

a receiving module, configured to receive terminal side measurement information based on the positioning node reference signal and sent by the target terminal; and a processing module, configured to perform a base station side measurement based on the positioning node reference signal, and obtain base station side measurement information based on the positioning node reference signal; where the sending module is further configured to send the terminal side measurement information based on the positioning node reference signal and the base station side measurement information based on the positioning node reference signal to the location server, so that the location server calculates location information of the target terminal.

According to a ninth aspect, an embodiment of the present disclosure provides a terminal, including:

a receiving module, configured to receive a terminal side measurement request that is based on a positioning node reference signal and sent by a positioning apparatus according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information;

a processing module, configured to perform, according to the terminal side measurement request, a terminal side measurement based on the positioning node reference signal; and a sending module, configured to send terminal side measurement information based on the positioning node reference signal to the positioning apparatus.

According to a tenth aspect, an embodiment of the present disclosure provides a base station, including:

a receiving module, configured to receive a base station side measurement request that is based on a positioning node reference signal and sent by a location server according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information;

a processing module, configured to perform, according to the base station side measurement request, a base station side measurement based on the positioning node reference signal; and a sending module, configured to send base station side measurement information based on the positioning node reference signal.

In a first possible implementation manner of the tenth aspect, the receiving module is further configured to:

before receiving the base station side measurement request based on the positioning node reference signal and sent by the location server, receive a request sent by the location server for the configuration information of the positioning node reference signal; and when the serving base station has configured the positioning node reference signal for the target terminal, the sending module is further configured to:

send the configuration information of the positioning node reference signal of the target terminal to the location server; or when the serving base station has not configured the positioning node reference signal for the target terminal, the processing module is further configured to:

configure the positioning node reference signal for the target terminal; and the sending module is further configured to send the configuration information of the configured positioning node reference signal to the location server.

With reference to the tenth aspect or the first possible implementation manner of the tenth aspect, in a second possible implementation manner of the tenth aspect, the receiving module is further configured to:

receive a query request that is sent by the location server and used to confirm whether a plurality of positioning nodes shares a same cell identity within coverage of the serving base station; and the sending module is further configured to send, to the location server, confirmation information used to indicate that the same cell identity is shared by the plurality of positioning nodes within the coverage of the serving base station.

With reference to the second possible implementation manner of the tenth aspect, in a third possible implementation manner of the tenth aspect, the sending module is further configured to:

after sending, to the location server, the confirmation information used to indicate that the same cell identity is shared by the plurality of positioning nodes within the coverage of the serving base station, send at least one piece of positioning node information to the location server, so that the location server determines, according to the positioning node information, whether the target terminal to be positioned subsequently is in a scenario in which the same cell identity is shared by the plurality of positioning nodes, where the positioning node information includes at least one of the following information:

the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

With reference to any one of the tenth aspect, or the first to the third possible implementation manners of the tenth aspect, in a fourth possible implementation manner of the tenth aspect, the base station side measurement information based on the positioning node reference signal includes:

the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

With reference to any one of the tenth aspect, or the first to the fourth possible implementation manners of the tenth aspect, in a fifth possible implementation manner of the tenth aspect, the positioning node reference signal is a channel state information-reference signal (CSI-RS).

According to an eleventh aspect, an embodiment of the present disclosure provides a location server, including:

a sending module, configured to send a base station side measurement request based on a positioning node reference signal to a serving base station of a target terminal according to configuration information of the positioning node reference signal, and send a terminal side measurement request based on the positioning node reference signal to the target terminal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information;

a receiving module, configured to receive base station side measurement information based on the positioning node reference signal and sent by the serving base station, and receive terminal side measurement information based on the positioning node reference signal and sent by the target terminal; and a processing module, configured to calculate location information of the target terminal according to the base station side measurement information based on the positioning node reference signal and the terminal side measurement information based on the positioning node reference signal.

According to a twelfth aspect, an embodiment of the present disclosure provides a location server, including:

a sending module, configured to send a location measurement request based on a positioning node reference signal in location assistance information to a target terminal, so that the target terminal performs a reference signal time difference (RSTD) measurement based on the positioning node reference signal, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information;

a receiving module, configured to receive RSTD measurement information based on the positioning node reference signal and sent by the target terminal; and a processing module, configured to calculate location information of the target terminal according to the RSTD measurement information based on the positioning node reference signal.

In a first possible implementation manner of the twelfth aspect, the sending module is further configured to:

before sending the location measurement request based on the positioning node reference signal in the location assistance information to the target terminal, send the location assistance information to the target terminal.

With reference to the first possible implementation manner of the twelfth aspect, in a second possible implementation manner of the twelfth aspect, the sending module is further configured to:

before sending the location assistance information to the target terminal, send a request for the configuration information of the positioning node reference signal to the serving base station; and the receiving module is further configured to receive the configuration information that is of the positioning node reference signal of the target terminal and sent by the serving base station.

With reference to the twelfth aspect, in a third possible implementation manner of the twelfth aspect, the receiving module is further configured to:

after the location measurement request based on the positioning node reference signal in the location assistance information is sent to the target terminal, receive a request sent by the target terminal for the location assistance information; and the sending module is further configured to send the location assistance information to the target terminal.

With reference to the third possible implementation manner of the twelfth aspect, in a fourth possible implementation manner of the twelfth aspect, the sending module is further configured to:

before sending the location measurement request based on the positioning node reference signal in the location assistance information to the target terminal, send a request for the configuration information of the positioning node reference signal to the serving base station; and the receiving module is further configured to receive the configuration information that is of the positioning node reference signal of the target terminal and sent by the serving base station.

With reference to any one of the twelfth aspect, or the first to the fourth possible implementation manners of the twelfth aspect, in a fifth possible implementation manner of the twelfth aspect, the sending module is further configured to:

send, to the serving base station, a query request used to confirm whether the same cell identity is shared by a plurality of positioning nodes within the coverage of the serving base station; and the receiving module is further configured to receive confirmation information sent by the serving base station and used to indicate that the same cell identity is shared by the plurality of positioning nodes within the coverage of the serving base station.

With reference to the fifth possible implementation manner of the twelfth aspect, in a sixth possible implementation manner of the twelfth aspect, the receiving module is further configured to:

after receiving the confirmation information, receive at least one piece of positioning node information sent by the serving base station, so that the location server determines, according to the positioning node information, whether the target terminal to be positioned subsequently is in a scenario in which the same cell identity is shared by the plurality of positioning nodes, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

With reference to the fifth possible implementation manner of the twelfth aspect or the sixth possible implementation manner of the twelfth aspect, in a seventh possible implementation manner of the twelfth aspect, the query request is included in a cell location information request, and the confirmation information is included in cell location information, where the cell location information includes at least the cell identity, a tracking area code, an absolute carrier frequency and transmission bandwidth of a cell positioning reference signal corresponding to the cell identity, a transmission timing, a quantity of transmission subframes, a transmit antenna port, and location information of an access point that sends the cell positioning reference signal corresponding to the cell identity.

With reference to any one of the twelfth aspect, or the first to the seventh possible implementation manners of the twelfth aspect, in an eighth possible implementation manner of the twelfth aspect, the RSTD measurement information based on the positioning node reference signal includes:

a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

With reference to any one of the twelfth aspect, or the first to the eighth possible implementation manners of the twelfth aspect, in a ninth possible implementation manner of the twelfth aspect, the positioning node reference signal is a channel state information-reference signal (CSI-RS).

According to a thirteenth aspect, an embodiment of the present disclosure provides a terminal, the terminal being a target terminal, including:

a receiving module, configured to receive a location measurement request based on a positioning node reference signal in location assistance information and sent by a location server, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information;

a processing module, configured to perform a reference signal time difference (RSTD) measurement based on the positioning node reference signal; and a sending module, configured to send RSTD measurement information based on the positioning node reference signal to the location server, so that the location server performs location calculation according to the RSTD measurement information based on the positioning node reference signal.

In a first possible implementation manner of the thirteenth aspect, the receiving module is further configured to:

before receiving the location measurement request based on the positioning node reference signal in the location assistance information and sent by the location server, receive the location assistance information sent by the location server.

With reference to the thirteenth aspect, in a second possible implementation manner of the thirteenth aspect, the sending module is further configured to:

after the receiving module receives the location measurement request based on the positioning node reference signal in the location assistance information and sent by the location server, send a request for the location assistance information to the location server; and the receiving module is further configured to receive the location assistance information sent by the location server.

With reference to the thirteenth aspect or the first possible implementation manner of the thirteenth aspect or the second possible implementation manner of the thirteenth aspect, in a third possible implementation manner of the thirteenth aspect, the RSTD measurement information based on the positioning node reference signal includes:

a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

With reference to any one of the thirteenth aspect, or the first to the third possible implementation manners of the thirteenth aspect, in a fourth possible implementation manner of the thirteenth aspect, the positioning node reference signal is a channel state information-reference signal (CSI-RS).

According to a fourteenth aspect, an embodiment of the present disclosure provides a base station, the base station being a serving base station, including:

a receiving module, configured to receive a request sent by a location server for configuration information of a positioning node reference signal; and a sending module, configured to send configuration information of a positioning node reference signal of a target terminal to the location server, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information.

In a first possible implementation manner of the fourteenth aspect, that the sending module sends the configuration information of the positioning node reference signal of the target terminal to the location server includes:

when the base station has configured the positioning node reference signal for the target terminal, the sending module sends the configuration information of the positioning node reference signal of the target terminal to the location server; or when the base station has not configured the positioning node reference signal for the target terminal, the base station further includes:

a processing module, configured to configure the positioning node reference signal for the target terminal; where the sending module is configured to send the configuration information of the configured positioning node reference signal to the location server.

With reference to the first possible implementation manner of the fourteenth aspect, in a second possible implementation manner of the fourteenth aspect, the receiving module is further configured to:

receive a query request that is sent by the location server and used to confirm whether a plurality of positioning nodes shares a same cell identity within coverage of the serving base station; and the sending module is further configured to send, to the location server, confirmation information used to indicate that the same cell identity is shared by the plurality of positioning nodes within the coverage of the serving base station.

With reference to the second possible implementation manner of the fourteenth aspect, in a third possible implementation manner of the fourteenth aspect, the sending module is further configured to:

after sending the confirmation information to the location server, send at least one piece of positioning node information to the location server, where the positioning node information includes any one or a combination of the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

With reference to the second possible implementation manner of the fourteenth aspect or the third possible implementation manner of the fourteenth aspect, in a fourth possible implementation manner of the fourteenth aspect, the query request is included in a cell location information request, and the confirmation information is included in cell location information, where the cell location information includes at least the cell identity, a tracking area code, an absolute carrier frequency and transmission bandwidth of a cell positioning reference signal corresponding to the cell identity, a transmission timing, a quantity of transmission subframes, a transmit antenna port, and location information of an access point that sends the cell positioning reference signal corresponding to the cell identity.

With reference to any one of the fourteenth aspect, or the first to the fourth possible implementation manners of the fourteenth aspect, in a fifth possible implementation manner of the fourteenth aspect, the positioning node reference signal is a channel state information-reference signal (CSI-RS).

In the positioning method and apparatus provided by the embodiments of the present disclosure, a serving base station sends a terminal side measurement request based on a positioning node reference signal to a target terminal according to configuration information of the positioning node reference signal; the serving base station performs a base station side measurement based on the positioning node reference signal, obtains base station side measurement information based on the positioning node reference signal, and then sends terminal side measurement information based on the positioning node reference signal and the base station side measurement information based on the positioning node reference signal to a location server, so that the location server calculates location information of the target terminal. Therefore, accurate positioning can be implemented on a terminal in a scenario in which a plurality of positioning nodes shares a same cell identity.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
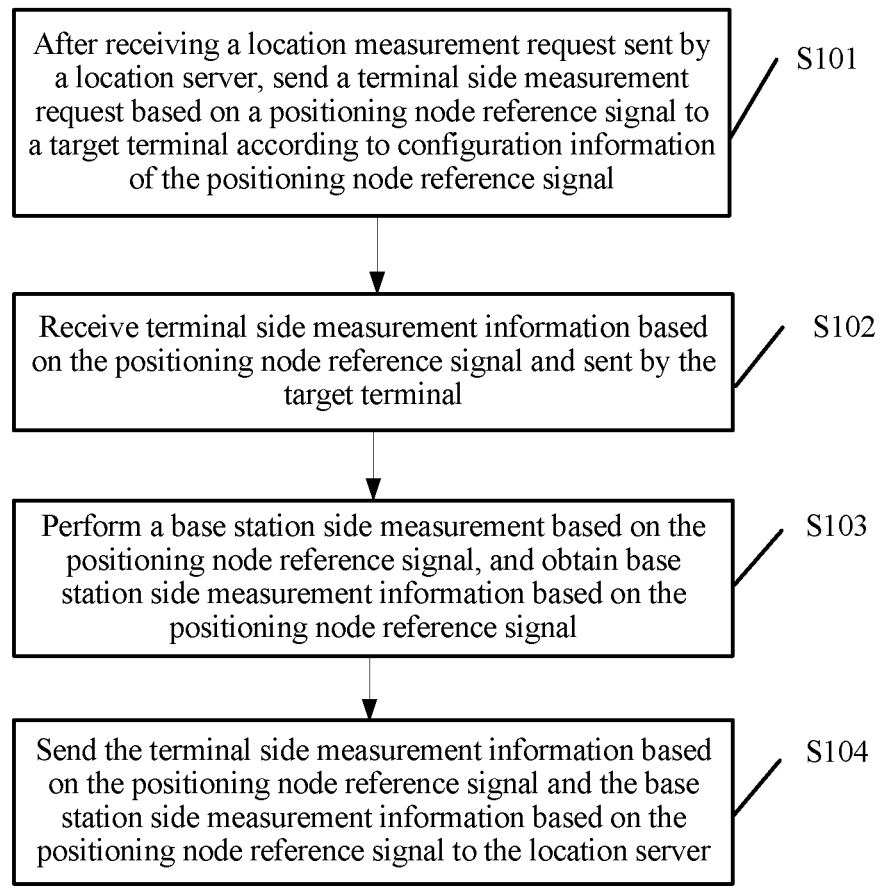
FIG. 1 is a flowchart of Embodiment 1 of a positioning method according to the present disclosure.

FIG. 1 is a flowchart of Embodiment 1 of a positioning method according to the present disclosure. This embodiment is described by using an example in which a serving base station of a positioned target terminal performs the method. As shown in FIG. 1, the method in this embodiment may include:

S101. After receiving a location measurement request sent by a location server, the serving base station sends a terminal side measurement request based on a positioning node reference signal to a target terminal according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information.

Optionally, the configuration information of the positioning node reference signal further includes transmit power information.

Specifically, the location measurement request may be carried in LTE positioning protocol A (LPPa) signaling. The positioning node identity, for example, may be an index of a positioning node.

Specifically, the foregoing execution process is based on a prerequisite that the serving base station knows that the positioning node reference signal has been configured for the target terminal.

If the serving base station does not know whether the positioning node reference signal has been configured for the target terminal, before the serving base station sends the terminal side measurement request based on the positioning node reference signal to the target terminal according to the configuration information of the positioning node reference signal, the method further includes:

determining, by the serving base station, whether the positioning node reference signal has been configured for the target terminal.

When the serving base station has configured the positioning node reference signal for the target terminal, step S101 may be specifically:

S101a. The serving base station sends the terminal side measurement request based on the positioning node reference signal to the target terminal according to the configuration information of the configured positioning node reference signal.

When the serving base station has not configured the positioning node reference signal for the target terminal, step S101 may be specifically:

S101b. The serving base station sends the configuration information of the positioning node reference signal to the target terminal. The configuration information of the positioning node reference signal may be carried in radio resource control (RRC) signaling.

S101c. The serving base station sends the terminal side measurement request based on the positioning node reference signal to the target terminal according to the configuration information that is of the positioning node reference signal and sent to the target terminal.

In steps S101b and S101c, one piece of signaling may be used for sending.

Still further, the foregoing execution process is based on a prerequisite that the serving base station knows that the target terminal is in a scenario in which a plurality of positioning nodes shares a same cell identity. If the serving base station does not know whether the positioning node reference signal has been configured for the target terminal, after the serving base station receives the location measurement request sent by the location server, the method in this embodiment further includes:

determining, by the serving base station, whether the target terminal is in a scenario in which a plurality of positioning nodes shares a same cell identity, that is, the serving base station needs to determine whether the target terminal is in the scenario in which the same cell identity is shared by the plurality of positioning nodes; if the target terminal is not in the scenario in which the same cell identity is shared by the plurality of positioning nodes, positioning is performed according to an e-CID positioning mode in the prior art, which is not further described herein.

S102. The serving base station receives terminal side measurement information based on the positioning node reference signal and sent by the target terminal.

S103. The serving base station performs a base station side measurement based on the positioning node reference signal, and obtains base station side measurement information based on the positioning node reference signal.

S104. The serving base station sends the terminal side measurement information based on the positioning node reference signal and the base station side measurement information based on the positioning node reference signal to the location server, so that the location server calculates location information of the target terminal.

Specifically, after the serving base station receives the terminal side measurement information based on the positioning node reference signal and sent by the target terminal, the terminal side measurement information and the base station side measurement information based on the positioning node reference signal are packed together and reported to the location server. The reporting process may be implemented by using LPPa signaling. The terminal side measurement information based on the positioning node reference signal includes the cell identity, the positioning node identity or positioning node reference signal identity, and a terminal side reception-transmission time difference corresponding to the positioning node identity or positioning node reference signal identity. The base station side measurement information based on the positioning node reference signal includes the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal. Finally, the location server may calculate the location information of the target terminal according to the terminal side measurement information based on the positioning node reference signal and the base station side measurement information based on the positioning node reference signal.

The positioning node reference signal in this embodiment, for example, may be a channel-state information reference signal (CSI-RS), or may be reference signals of different nodes that can be configured in a same cell.

In the positioning method provided by this embodiment, a serving base station sends a terminal side measurement request based on a positioning node reference signal to a target terminal according to configuration information of the positioning node reference signal; the serving base station performs a base station side measurement based on the positioning node reference signal, obtains base station side measurement information based on the positioning node reference signal, and then sends terminal side measurement information based on the positioning node reference signal and the base station side measurement information based on the positioning node reference signal to a location server, so that the location server calculates location information of the target terminal. Therefore, accurate positioning can be implemented on a terminal in a scenario in which a plurality of positioning nodes shares a same cell identity.

Figure 2:
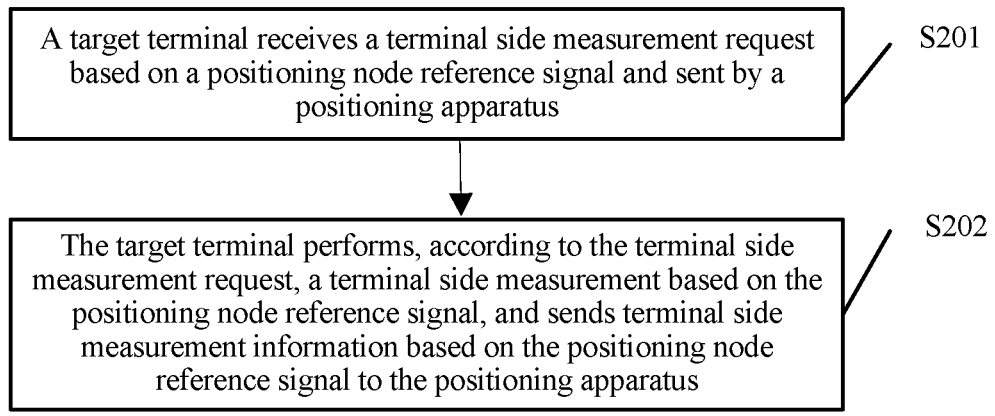
FIG. 2 is a flowchart of Embodiment 2 of a positioning method according to the present disclosure.

FIG. 2 is a flowchart of Embodiment 2 of a positioning method according to the present disclosure. This embodiment is described by using an example in which a positioned target terminal performs the method. As shown in FIG. 2, the method in this embodiment may include:

S201. The target terminal receives a terminal side measurement request based on a positioning node reference signal and sent by a positioning apparatus, where configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information.

Optionally, the configuration information of the positioning node reference signal further includes transmit power information.

S202. The target terminal performs, according to the terminal side measurement request, a terminal side measurement based on the positioning node reference signal, and sends terminal side measurement information based on the positioning node reference signal to the positioning apparatus.

The positioning apparatus may be a serving base station. In this case, the method further includes:

receiving, by the target terminal, the configuration information that is of the positioning node reference signal and sent by the serving base station.

The positioning apparatus may also be a location server.

The terminal side measurement information based on the positioning node reference signal includes a cell identity, the positioning node identity or positioning node reference signal identity, and a terminal side reception-transmission time difference corresponding to the positioning node identity or positioning node reference signal identity.

The positioning node reference signal in this embodiment, for example, may be a CSI-RS, or may be reference signals of different nodes that can be configured in a same cell.

In the positioning method provided by this embodiment, after a target terminal receives a terminal side measurement request based on a positioning node reference signal and sent by a positioning apparatus, the target terminal performs, according to the terminal side measurement request, a terminal side measurement based on the positioning node reference signal, and sends terminal side measurement information based on the positioning node reference signal to the positioning apparatus, so that the location apparatus calculates location information of the target terminal. Therefore, accurate positioning can be implemented on a terminal in a scenario in which a plurality of positioning nodes shares a same cell identity.

The following uses a specific embodiment to describe in detail a technical solution of the method embodiments shown in FIG. 1 and FIG. 2.

Figure 3:
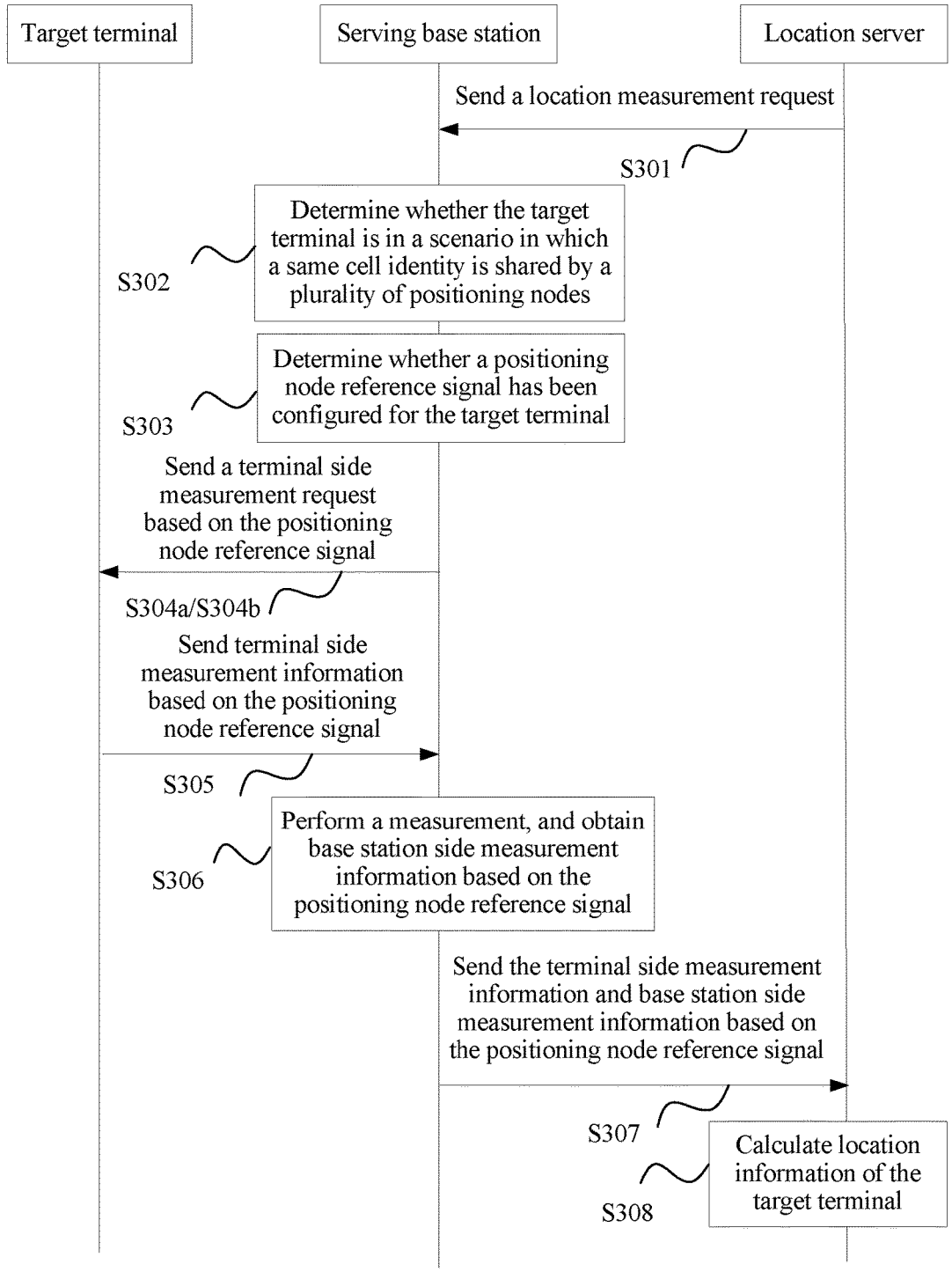
FIG. 3 is an interaction flowchart of Embodiment 3 of a positioning method according to the present disclosure.

FIG. 3 is an interaction flowchart of Embodiment 3 of a positioning method according to the present disclosure. As shown in FIG. 3, this embodiment is described by using an example in which a serving base station does not know that a target terminal is in a scenario in which a plurality of positioning nodes shares a same cell identity. The method in this embodiment may include:

S301. A location server sends a location measurement request to the serving base station.

S302. The serving base station determines whether the target terminal is in a scenario in which a plurality of positioning nodes shares a same cell identity.

Because the target terminal is served by the serving base station, but the serving base station knows whether its own coverage includes the plurality of positioning nodes that share the same cell identity, the serving base station may directly determine whether the target terminal is in the scenario in which the same cell identity is shared by the plurality of positioning nodes. If yes, step S303 is performed. Otherwise, the serving base station may use a conventional e-CID positioning method to perform a terminal side measurement on the target terminal.

S303. The serving base station determines whether a positioning node reference signal has been configured for the target terminal.

Specifically, when the serving base station has configured the positioning node reference signal for the target terminal, step S304a is performed; when the serving base station has not configured the positioning node reference signal for the target terminal, step S304b is performed.

S304a. The serving base station sends a terminal side measurement request based on the positioning node reference signal to the target terminal according to configuration information of the configured positioning node reference signal.

S304b. The serving base station sends configuration information of the positioning node reference signal to the target terminal, and sends a terminal side measurement request based on the positioning node reference signal to the target terminal according to the configuration information that is of the positioning node reference signal and sent to the target terminal.

The configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information.

Optionally, the configuration information of the positioning node reference signal further includes transmit power information.

S305. The target terminal performs, according to the terminal side measurement request, a terminal side measurement based on the positioning node reference signal, and sends terminal side measurement information based on the positioning node reference signal to the serving base station.

S306. The serving base station performs a base station side measurement based on the positioning node reference signal, and obtains base station side measurement information based on the positioning node reference signal. Step S306 may be performed before or after step S304a or step S304b.

S307. The serving base station sends the terminal side measurement information based on the positioning node reference signal and the base station side measurement information based on the positioning node reference signal to the location server.

S308. The location server calculates location information of the target terminal according to the terminal side measurement information based on the positioning node reference signal and the base station side measurement information based on the positioning node reference signal.

The foregoing whole process may implement accurate positioning on a terminal in a scenario in which a plurality of positioning nodes shares a same cell identity.

An embodiment of the present disclosure provides another positioning method based on a non-terminal-oriented interaction that exists between a base station and a location server, where the interaction may be performed periodically, or may be performed before positioning is performed. The following describes the method in detail with reference to an accompanying drawing.

Figure 4:
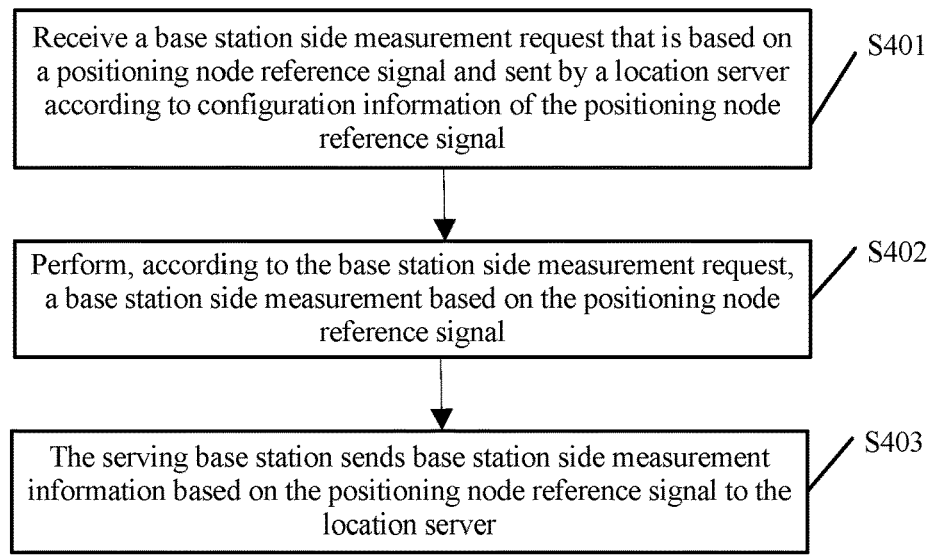
FIG. 4 is a flowchart of Embodiment 4 of a positioning method according to the present disclosure.

FIG. 4 is a flowchart of Embodiment 4 of a positioning method according to the present disclosure. This embodiment is described by using an example in which a serving base station of a positioned target terminal performs the method. As shown in FIG. 4, the method in this embodiment may include:

S401. The serving base station of the target terminal receives a base station side measurement request that is based on a positioning node reference signal and sent by a location server according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information.

Optionally, the configuration information of the positioning node reference signal further includes transmit power information.

Specifically, the base station side measurement request that is based on the positioning node reference signal may be carried in LPPa signaling. The positioning node identity, for example, may be an index of a positioning node.

Specifically, the foregoing execution process is based on a prerequisite that the location server knows that a serving base station has configured the positioning node reference signal for the target terminal.

If the serving base station does not know whether the positioning node reference signal has been configured for the target terminal, before step S401, the method further includes:

receiving, by the serving base station, a request sent by the location server for the configuration information of the positioning node reference signal; and when the serving base station has configured the positioning node reference signal for the target terminal, sending, by the serving base station, the configuration information of the positioning node reference signal of the target terminal to the location server; or when the serving base station has not configured the positioning node reference signal for the target terminal, configuring, by the serving base station, the positioning node reference signal for the target terminal; and sending, by the serving base station, the configuration information of the configured positioning node reference signal to the location server.

Still further, the foregoing execution process is based on a prerequisite that the location server knows that the target terminal is in a scenario in which a plurality of positioning nodes shares a same cell identity. If the serving base station does not know whether the positioning node reference signal has been configured for the target terminal, the method in this embodiment may further include:

receiving, by the serving base station, a query request that is sent by the location server and used to confirm whether a plurality of positioning nodes shares a same cell identity within coverage of the serving base station; and sending, by the serving base station, to the location server, confirmation information used to indicate that the same cell identity is shared by the plurality of positioning nodes within the coverage of the serving base station.

Herein it should be noted that, the query process is a non-terminal-oriented interaction process, and may be performed periodically, or may be performed before the location server performs positioning, where the process is oriented to a positioning base station instead of a particular terminal.

After the serving base station sends, to the location server, the confirmation information used to indicate that the same cell identity is shared by the plurality of positioning nodes within the coverage of the serving base station, the method may further include:

sending, by the serving base station, at least one piece of positioning node information to the location server, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

In this way, after receiving the at least one piece of positioning node information, the location server may learn situations of positioning nodes within coverage of different base stations, and in subsequent positioning, the location server may determine, according to the previously received positioning node information, whether the target terminal to be positioned is in the scenario in which the same cell identity is shared by the plurality of positioning nodes.

S402. The serving base station performs, according to the base station side measurement request, a base station side measurement based on the positioning node reference signal.

S403. The serving base station sends base station side measurement information based on the positioning node reference signal to the location server.

The base station side measurement information based on the positioning node reference signal includes:

the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

The positioning node reference signal in this embodiment, for example, may be a CSI-RS, or may be reference signals of different nodes that can be configured in a same cell.

In the positioning method provided by this embodiment, after a serving base station receives a base station side measurement request that is based on a positioning node reference signal and sent by a location server according to configuration information of the positioning node reference signal, the serving base station performs a base station side measurement based on the positioning node reference signal, obtains base station side measurement information based on the positioning node reference signal, and then sends the base station side measurement information based on the positioning node reference signal to the location server, so that the location server calculates location information of a target terminal. Therefore, accurate positioning can be implemented on a terminal in a scenario in which a plurality of positioning nodes shares a same cell identity.

Figure 5:
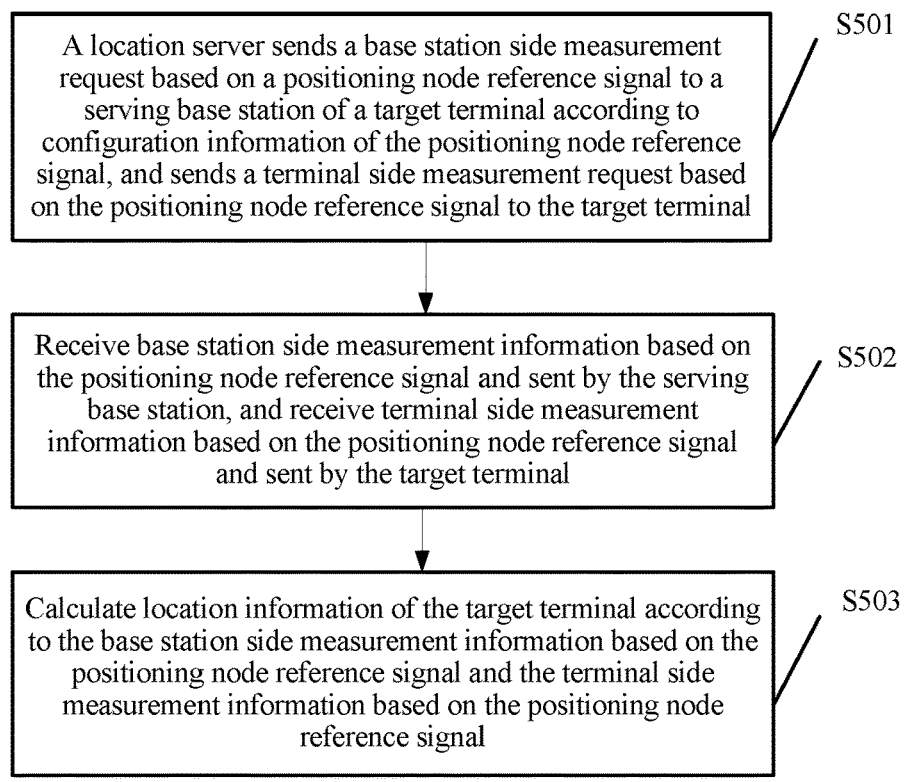
FIG. 5 is a flowchart of Embodiment 5 of a positioning method according to the present disclosure.

FIG. 5 is a flowchart of Embodiment 5 of a positioning method according to the present disclosure. This embodiment is described by using an example in which a location server performs the method. As shown in FIG. 5, the method in this embodiment may include:

S501. The location server sends a base station side measurement request based on a positioning node reference signal to a serving base station of a target terminal according to configuration information of the positioning node reference signal, and sends a terminal side measurement request based on the positioning node reference signal to the target terminal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information.

Optionally, the configuration information of the positioning node reference signal further includes transmit power information.

Specifically, the base station side measurement request or terminal side measurement request that is based on the positioning node reference signal may be carried in LPPa signaling. The positioning node identity, for example, may be an index of a positioning node.

Specifically, the foregoing execution process is based on a prerequisite that the location server knows that a serving base station has configured the positioning node reference signal for the target terminal.

If the serving base station does not know whether the positioning node reference signal has been configured for the target terminal, before the location server sends the base station side measurement request based on the positioning node reference signal to the serving base station of the target terminal, the method further includes:

sending, by the location server, a request for the configuration information of the positioning node reference signal to the serving base station; and receiving, by the location server, the configuration information that is of the positioning node reference signal of the target terminal and sent by the serving base station.

Still further, the foregoing execution process is based on a prerequisite that the location server knows that the target terminal is in a scenario in which a plurality of positioning nodes shares a same cell identity. If the serving base station does not know whether the positioning node reference signal has been configured for the target terminal, the method in this embodiment may further include:

sending, by the location server, to the serving base station, a query request used to confirm whether a plurality of positioning nodes shares a same cell identity within coverage of the serving base station; and receiving, by the location server, confirmation information sent by the serving base station and used to indicate that the same cell identity is shared by the plurality of positioning nodes within the coverage of the serving base station.

Herein it should be noted that, the query process is a non-terminal-oriented interaction process, and may be performed periodically, or may be performed before the location server performs positioning, where the process is oriented to a positioning base station instead of a particular terminal.

After the location server receives the confirmation information sent by the serving base station and used to indicate that the same cell identity is shared by the plurality of positioning nodes within the coverage of the serving base station, the method may further include:

receiving, by the location server, at least one piece of positioning node information sent by the serving base station, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

In this way, after receiving the at least one piece of positioning node information, the location server may learn situations of positioning nodes within coverage of different base stations, and in subsequent positioning, the location server may determine, according to the previously received positioning node information, whether the target terminal to be positioned is in the scenario in which the same cell identity is shared by the plurality of positioning nodes.

S502. The location server receives base station side measurement information based on the positioning node reference signal and sent by the serving base station, and receives terminal side measurement information based on the positioning node reference signal and sent by the target terminal.

The terminal side measurement information based on the positioning node reference signal includes the cell identity, the positioning node identity or positioning node reference signal identity, and a terminal side reception-transmission time difference corresponding to the positioning node identity or positioning node reference signal identity.

The base station side measurement information based on the positioning node reference signal includes the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

S503. The location server calculates location information of the target terminal according to the base station side measurement information based on the positioning node reference signal and the terminal side measurement information based on the positioning node reference signal.

The positioning node reference signal in this embodiment, for example, may be a CSI-RS, or may be reference signals of different nodes that can be configured in a same cell.

In the positioning method provided by this embodiment, a location server sends a base station side measurement request based on a positioning node reference signal to a serving base station of a target terminal according to configuration information of the positioning node reference signal, sends a terminal side measurement request based on the positioning node reference signal to the target terminal, then receives base station side measurement information based on the positioning node reference signal and terminal side measurement information based on the positioning node reference signal, and finally calculates location information of the target terminal. Therefore, accurate positioning can be implemented on a terminal in a scenario in which a plurality of positioning nodes shares a same cell identity.

The following uses a specific embodiment to describe in detail a technical solution of the method embodiments shown in FIG. 4 and FIG. 5.

Figure 6:
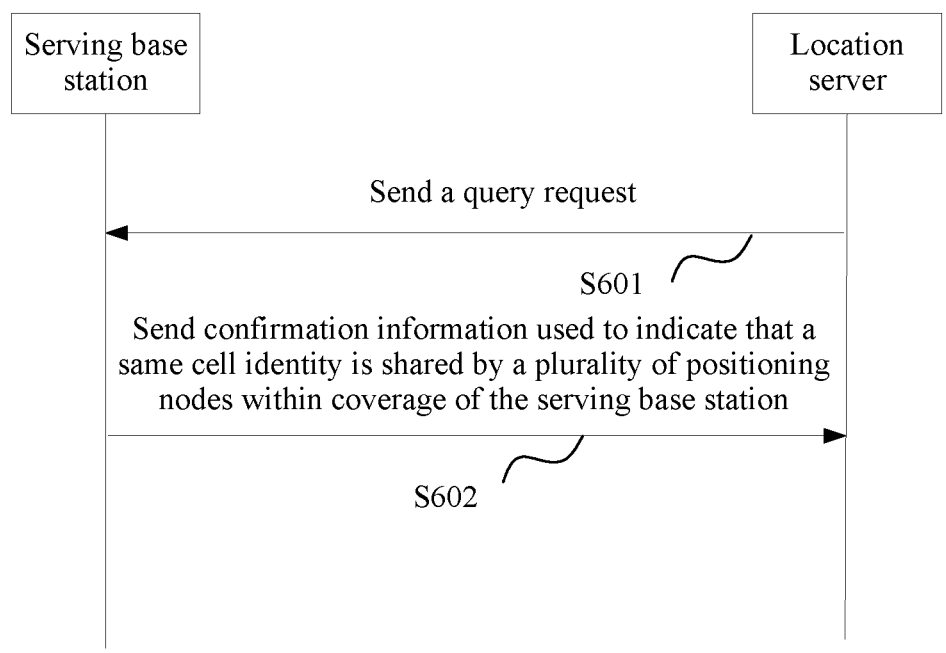
FIG. 6 is a non-terminal-oriented interaction flowchart of Embodiment 6 of a positioning method according to the present disclosure.

FIG. 6 is a non-terminal-oriented interaction flowchart of Embodiment 6 of a positioning method according to the present disclosure. As shown in FIG. 6, the method in this embodiment may include:

S601. A location server sends, to a serving base station, a query request used to confirm whether a plurality of positioning nodes shares a same cell identity within coverage of the serving base station.

If the same cell identity is shared by the plurality of positioning nodes within the coverage of the serving base station, step S602 is performed.

S602. The serving base station sends, to the location server, confirmation information used to indicate that the same cell identity is shared by the plurality of positioning nodes within the coverage of the serving base station.

If the same cell identity is not shared by any nodes within the coverage of the serving base station, the serving base station returns a negative reply to the location server.

Herein it should be noted that, the query process is a non-terminal-oriented interaction process, and may be performed periodically, or may be performed before the location server performs positioning, where the process is oriented to a positioning base station instead of a particular terminal.

The method may further include:

sending, by the serving base station, at least one piece of positioning node information to the location server, where the positioning node information includes at least one of the following information: the cell identity, a positioning node identity or a positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

In this way, after receiving the at least one piece of positioning node information, the location server may learn situations of positioning nodes within coverage of different base stations, and in subsequent positioning, the location server may determine, according to the previously received positioning node information, whether the target terminal to be positioned is in a scenario in which the same cell identity is shared by the plurality of positioning nodes.

Because the foregoing interaction not oriented to a target terminal exists between a location server and a serving base station, the location server knows whether a same cell identity is shared by a plurality of nodes within coverage of a current serving base station of the target terminal. The following processes are all performed based on a scenario in which a same cell identity is shared by a plurality of nodes within coverage of a serving base station. In a scenario in which a same cell identity is not shared by a plurality of nodes, a process of a conventional e-CID positioning method may be used to perform a location measurement.

Figure 7:
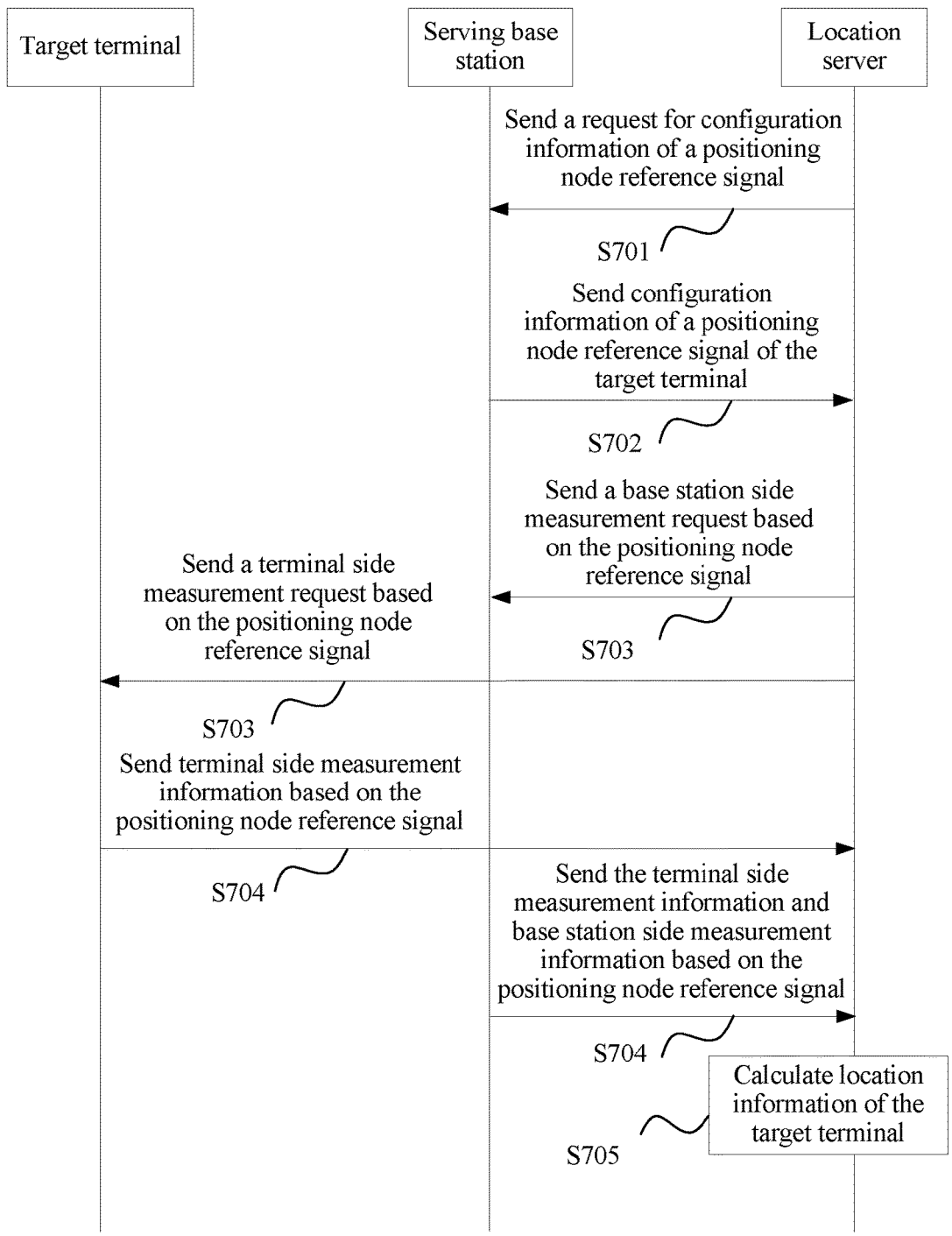
FIG. 7 is an interaction flowchart of Embodiment 6 of a positioning method according to the present disclosure.

FIG. 7 is an interaction flowchart of Embodiment 6 of a positioning method according to the present disclosure. As shown in FIG. 7, this embodiment is described by using an example in which a location server has known, from the interaction process shown in FIG. 6, that a target terminal is in a scenario in which a plurality of positioning nodes shares a same cell identity. The method in this embodiment may include:

S701. The location server sends a request for configuration information of a positioning node reference signal to a serving base station.

S702. The serving base station sends configuration information of a positioning node reference signal of the target terminal to the location server.

Specifically, when the serving base station has configured the positioning node reference signal for the target terminal, the serving base station sends the configuration information of the positioning node reference signal of the target terminal to the location server; If the serving base station does not know whether the positioning node reference signal has been configured for the target terminal, the serving base station configures the positioning node reference signal for the target terminal, and sends the configuration information of the configured positioning node reference signal to the location server.

S703. The location server sends a base station side measurement request based on the positioning node reference signal to the serving base station of the target terminal according to the configuration information of the positioning node reference signal, and sends a terminal side measurement request based on the positioning node reference signal to the target terminal.

S704. The serving base station sends base station side measurement information based on the positioning node reference signal to the location server. The target terminal sends terminal side measurement information based on the positioning node reference signal to the location server.

S705. The location server calculates location information of the target terminal according to the base station side measurement information based on the positioning node reference signal and the terminal side measurement information based on the positioning node reference signal.

An embodiment of the present disclosure provides still another positioning method, which is hereinafter described in detail with reference an accompanying drawing.

Figure 8:
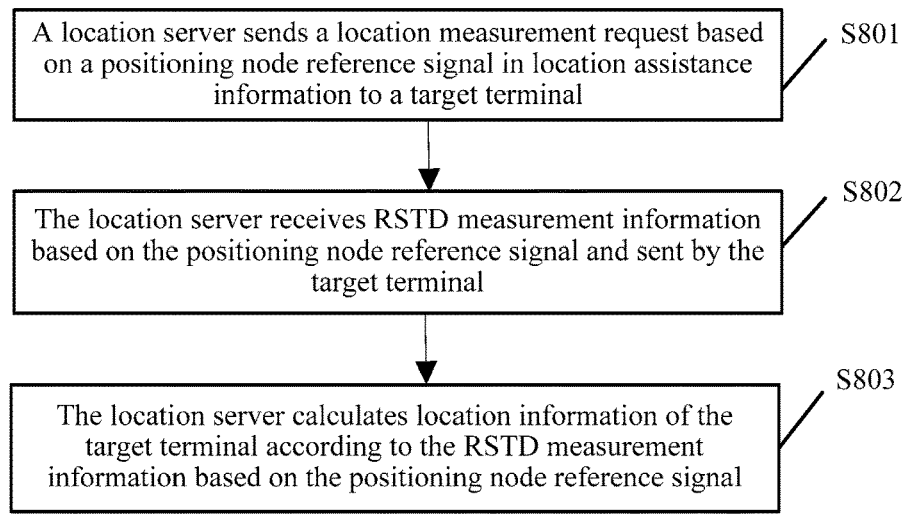
FIG. 8 is a flowchart of Embodiment 7 of a positioning method according to the present disclosure.

FIG. 8 is a flowchart of Embodiment 7 of a positioning method according to the present disclosure. This embodiment is described by using an example in which a location server performs the method. As shown in FIG. 8, the method in this embodiment may include:

S801. The location server sends a location measurement request based on a positioning node reference signal in location assistance information to a target terminal, so that the target terminal performs a reference signal time difference (RSTD) measurement based on the positioning node reference signal, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information.

Optionally, the configuration information of the positioning node reference signal further includes transmit power information.

In an optional implementation manner, before step S801, the method may further include:

sending, by the location server, the location assistance information to the target terminal.

Before the location server sends the location assistance information to the target terminal, the method may further include:

sending, by the location server, a request for the configuration information of the positioning node reference signal to the serving base station; and receiving, by the location server, the configuration information that is of the positioning node reference signal of the target terminal and sent by the serving base station.

In another optional implementation manner, after step S801, the method may further include:

receiving, by the location server, a request sent by the target terminal for the location assistance information; and sending, by the location server, the location assistance information to the target terminal.

Before the location server sends the location measurement request based on the positioning node reference signal in the location assistance information to the target terminal, the method may further include:

sending, by the location server, a request for the configuration information of the positioning node reference signal to the serving base station; and receiving, by the location server, the configuration information that is of the positioning node reference signal of the target terminal and sent by the serving base station.

In the foregoing embodiment, the method further includes:

sending, by the location server, to the serving base station, a query request used to confirm whether the same cell identity is shared by a plurality of positioning nodes within the coverage of the serving base station; and receiving, by the location server, confirmation information sent by the serving base station and used to indicate that the same cell identity is shared by the plurality of positioning nodes within the coverage of the serving base station.

If the same cell identity is not shared by any nodes within the coverage of the serving base station, the serving base station returns a negative reply to the location server.

Herein it should be noted that, the query process is a non-terminal-oriented interaction process, and may be performed periodically, or may be performed before the location server performs positioning, where the process is oriented to a positioning base station instead of a particular terminal.

After the location server receives the confirmation information, the method may further include:

receiving, by the location server, at least one piece of positioning node information sent by the serving base station, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The foregoing query request may be sent separately or may be included in a cell location information request. When the query request is included in the cell location information request, the confirmation information is included in cell location information. The cell location information request is conventional non-terminal-oriented interaction information. Generally, the location server sends a request for querying for cell location information of the base station to the base station, and then the base station sends the cell location information of the base station to the location server. The cell location information includes but is not limited to: the cell identity (a physical cell ID or a global cell ID), a tracking area code, an absolute carrier frequency and transmission bandwidth of a cell positioning reference signal corresponding to the cell identity, a transmission timing, a quantity of transmission subframes, a transmit antenna port, location information of an access point that sends the cell positioning reference signal corresponding to the cell identity, and the like.

S802. The location server receives RSTD measurement information based on the positioning node reference signal and sent by the target terminal.

S803. The location server calculates location information of the target terminal according to the RSTD measurement information based on the positioning node reference signal.

The RSTD measurement information based on the positioning node reference signal includes:

a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

The positioning node reference signal in this embodiment, for example, may be a CSI-RS, or may be reference signals of different nodes that can be configured in a same cell.

In the positioning method provided by this embodiment, a location server sends a location measurement request based on a positioning node reference signal in location assistance information to a target terminal, so that the target terminal performs an RSTD measurement based on the positioning node reference signal; then the location server receives RSTD measurement information based on the positioning node reference signal and sent by the target terminal, and calculates location information of the target terminal according to the RSTD measurement information based on the positioning node reference signal. Therefore, accurate positioning can be implemented on a terminal in a scenario in which a plurality of positioning nodes shares a same cell identity.

Figure 9:
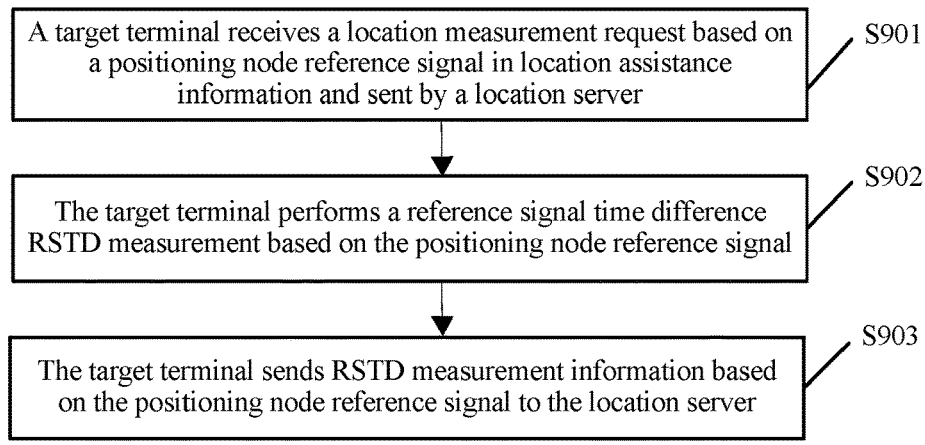
FIG. 9 is a flowchart of Embodiment 8 of a positioning method according to the present disclosure.

FIG. 9 is a flowchart of Embodiment 8 of a positioning method according to the present disclosure. This embodiment is described by using an example in which a target terminal performs the method. As shown in FIG. 9, the method in this embodiment may include:

S901. The target terminal receives a location measurement request based on a positioning node reference signal in location assistance information and sent by a location server, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information.

Optionally, the configuration information of the positioning node reference signal further includes transmit power information.

In an optional implementation manner, before the target terminal receives the location measurement request based on the positioning node reference signal in the location assistance information and sent by the location server, the method may further include:

receiving, by the target terminal, the location assistance information sent by the location server.

In another optional implementation manner, after the target terminal receives the location measurement request based on the positioning node reference signal in the location assistance information and sent by the location server, the method further includes:

sending, by the target terminal, a request for the location assistance information to the location server; and receiving, by the target terminal, the location assistance information sent by the location server.

S902. The target terminal performs a reference signal time difference RSTD measurement based on the positioning node reference signal.

S903. The target terminal sends RSTD measurement information based on the positioning node reference signal to the location server, so that the location server performs location calculation according to the RSTD measurement information based on the positioning node reference signal.

The RSTD measurement information based on the positioning node reference signal may include:

a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

The positioning node reference signal in this embodiment, for example, may be a CSI-RS, or may be reference signals of different nodes that can be configured in a same cell.

In the positioning method provided by this embodiment, after a target terminal receives a location measurement request based on a positioning node reference signal in location assistance information and sent by a location server, the target terminal performs an RSTD measurement based on the positioning node reference signal, and then sends RSTD measurement information based on the positioning node reference signal to the location server, so that the location server calculates location information of the target terminal according to the RSTD measurement information based on the positioning node reference signal. Therefore, accurate positioning can be implemented on a terminal in a scenario in which a plurality of positioning nodes shares a same cell identity.

Figure 10:
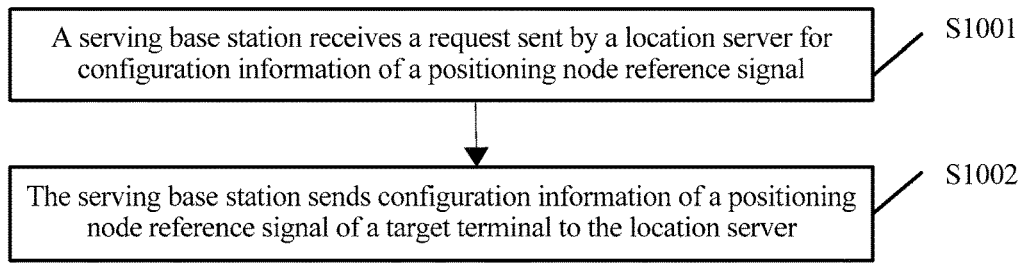
FIG. 10 is a flowchart of Embodiment 9 of a positioning method according to the present disclosure.

FIG. 10 is a flowchart of Embodiment 9 of a positioning method according to the present disclosure. This embodiment is described by using an example in which a serving base station performs the method. As shown in FIG. 10, the method in this embodiment may include:

S1001. The serving base station receives a request sent by a location server for configuration information of a positioning node reference signal.

S1002. The serving base station sends configuration information of a positioning node reference signal of a target terminal to the location server, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information.

Optionally, the configuration information of the positioning node reference signal further includes transmit power information.

Step S1002 may be specifically:

when the serving base station has configured the positioning node reference signal for the target terminal, the serving base station sends the configuration information of the positioning node reference signal of the target terminal to the location server; or when the serving base station has not configured the positioning node reference signal for the target terminal, the serving base station configures the positioning node reference signal for the target terminal, and sends the configuration information of the configured positioning node reference signal to the location server.

The method may further include:

receiving, by the serving base station, a query request that is sent by the location server and used to confirm whether a plurality of positioning nodes shares a same cell identity within coverage of the serving base station; and sending, by the serving base station, to the location server, confirmation information used to indicate that the same cell identity is shared by the plurality of positioning nodes within the coverage of the serving base station.

Herein it should be noted that, the query process is a non-terminal-oriented interaction process, and may be performed periodically, or may be performed before the location server performs positioning, where the process is oriented to a positioning base station instead of a particular terminal.

After the serving base station sends the confirmation information to the location server, the method may further include:

sending, by the serving base station, at least one piece of positioning node information to the location server, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The foregoing query request may be sent separately or may be included in a cell location information request. When the query request is included in the cell location information request, the confirmation information is included in cell location information. The cell location information request is conventional non-terminal-oriented interaction information. Generally, the location server sends a request for querying for cell location information of the base station to the base station, and then the base station sends the cell location information of the base station to the location server. The cell location information includes but is not limited to: the cell identity (a physical cell ID or a global cell ID), a tracking area code, an absolute carrier frequency and transmission bandwidth of a cell positioning reference signal corresponding to the cell identity, a transmission timing, a quantity of transmission subframes, a transmit antenna port, location information of an access point that sends the cell positioning reference signal corresponding to the cell identity, and the like.

The positioning node reference signal in this embodiment, for example, may be a CSI-RS, or may be reference signals of different nodes that can be configured in a same cell.

In the positioning method provided by this embodiment, after a serving base station receives a request sent by a location server for configuration information of a positioning node reference signal, the serving base station sends configuration information of a positioning node reference signal of a target terminal to the location server, so that the location server obtains the configuration information of the positioning node reference signal of the target terminal, which may further help the location server to accurately position the terminal in a scenario in which a plurality of positioning nodes shares a same cell identity.

The following uses two specific embodiments to describe in detail technical solutions of the method embodiments shown in FIG. 8 to FIG. 10.

In the following two embodiments, a manner of knowing, by a location server, that a target terminal is in a scenario in which a plurality of positioning nodes shares a same cell identity, may be implemented by using a non-terminal-oriented interaction process shown in FIG. 6, and is not further described herein.

Because an interaction not oriented to a target terminal as shown in FIG. 6 exists between a location server and a serving base station, the location server knows whether a same cell identity is shared by a plurality of nodes within coverage of a current serving base station of the target terminal. Both of the following processes are performed based on a scenario in which a same cell identity is shared by a plurality of nodes within coverage of a serving base station. In a scenario in which a same cell identity is not shared by a plurality of nodes, a process of a conventional OTDOA positioning method may be used to perform a location measurement.

Figure 11:
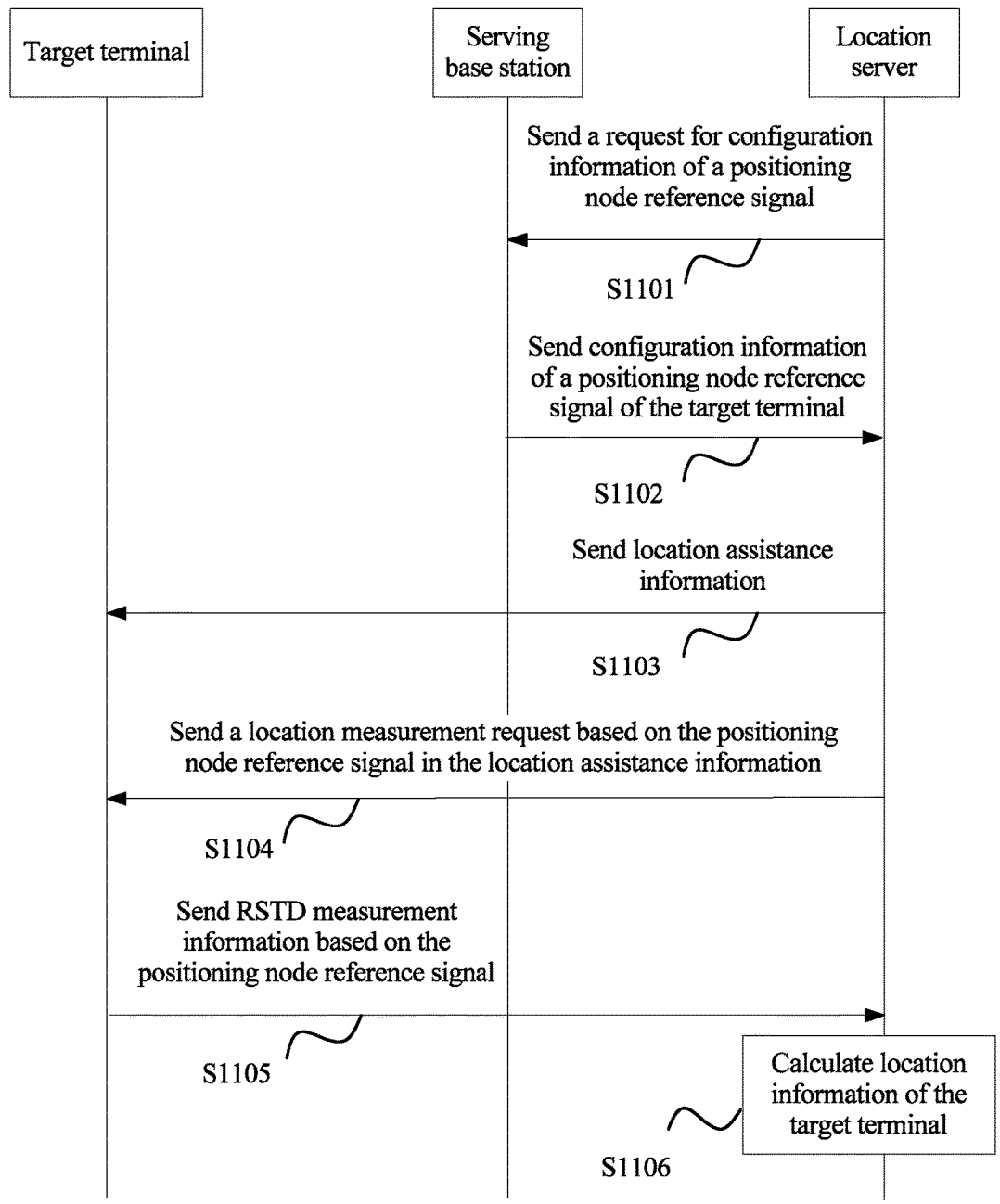
FIG. 11 is an interaction flowchart of Embodiment 10 of a positioning method according to the present disclosure.

FIG. 11 is an interaction flowchart of Embodiment 10 of a positioning method according to the present disclosure. As shown in FIG. 11, the method in this embodiment may include:

S1101. A location server sends a request for configuration information of a positioning node reference signal to a serving base station.

S1102. The serving base station sends configuration information of a positioning node reference signal of a target terminal to the location server.

Optionally, when the serving base station has configured the positioning node reference signal for the target terminal, the serving base station sends the configuration information of the positioning node reference signal of the target terminal to the location server; or when the serving base station has not configured the positioning node reference signal for the target terminal, the serving base station configures the positioning node reference signal for the target terminal, and sends the configuration information of the configured positioning node reference signal to the location server.

S1103. The location server sends location assistance information to the target terminal.

The location assistance information may be carried in LPP signaling.

S1104. The location server sends a location measurement request based on the positioning node reference signal in the location assistance information to the target terminal.

The location measurement request may be carried in LPP signaling.

S1105. The target terminal performs a reference signal time difference RSTD measurement based on the positioning node reference signal, and sends RSTD measurement information based on the positioning node reference signal to the location server.

The RSTD measurement information based on the positioning node reference signal may be carried in LPP signaling.

The RSTD measurement information based on the positioning node reference signal may include:

a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

S1106. The location server calculates location information of the target terminal according to the RSTD measurement information based on the positioning node reference signal.

Figure 12:
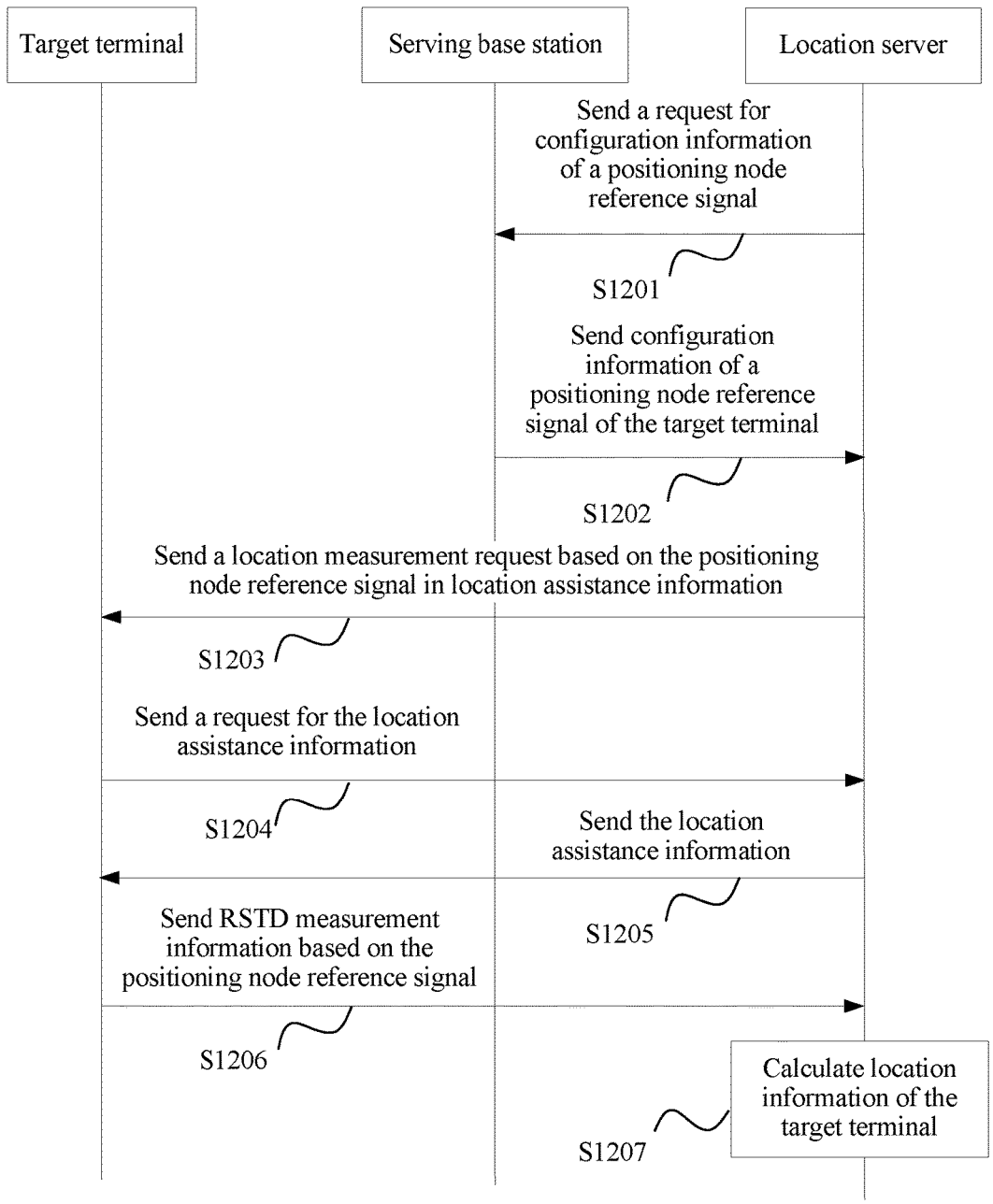
FIG. 12 is an interaction flowchart of Embodiment 11 of a positioning method according to the present disclosure.

FIG. 12 is an interaction flowchart of Embodiment 11 of a positioning method according to the present disclosure. As shown in FIG. 12, the method in this embodiment may include:

S1201. A location server sends a request for configuration information of a positioning node reference signal to a serving base station.

S1202. The serving base station sends configuration information of a positioning node reference signal of a target terminal to the location server.

Specifically, when the serving base station has configured the positioning node reference signal for the target terminal, the serving base station sends the configuration information of the positioning node reference signal of the target terminal to the location server; or when the serving base station has not configured the positioning node reference signal for the target terminal, the serving base station configures the positioning node reference signal for the target terminal, and sends the configuration information of the configured positioning node reference signal to the location server.

S1203. The location server sends a location measurement request based on the positioning node reference signal in location assistance information to the target terminal.

The location measurement request may be carried in LPP signaling.

S1204. The target terminal sends a request for the location assistance information to the location server.

The request for the location assistance information may be carried in LPP signaling.

S1205. The location server sends the location assistance information to the target terminal.

The location assistance information may be carried in LPP signaling.

S1206. The target terminal performs an RSTD measurement based on the positioning node reference signal, and sends RSTD measurement information based on the positioning node reference signal to the location server.

The RSTD measurement information based on the positioning node reference signal may be carried in LPP signaling.

The RSTD measurement information based on the positioning node reference signal may include:

a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

S1207. The location server calculates location information of the target terminal according to the RSTD measurement information based on the positioning node reference signal.

Figure 13:
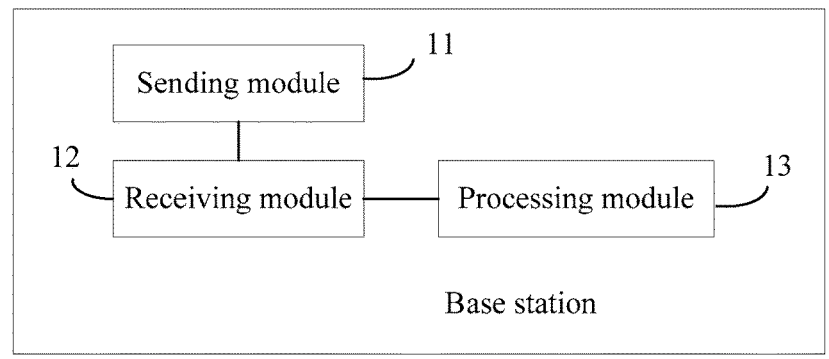
FIG. 13 is a schematic structural diagram of Embodiment 1 of a base station according to the present disclosure.

FIG. 13 is a schematic structural diagram of Embodiment 1 of a base station according to the present disclosure. As shown in FIG. 13, the base station in this embodiment may include a sending module 11, a receiving module 12, and a processing module 13. The sending module 11 is configured to send, after a location measurement request sent by a location server is received, a terminal side measurement request based on a positioning node reference signal to a target terminal according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information. The receiving module 12 is configured to receive terminal side measurement information based on the positioning node reference signal and sent by the target terminal. The processing module 13 is configured to perform a base station side measurement based on the positioning node reference signal, and obtain base station side measurement information based on the positioning node reference signal. The sending module 11 is further configured to send the terminal side measurement information based on the positioning node reference signal and the base station side measurement information based on the positioning node reference signal to the location server, so that the location server calculates location information of the target terminal.

Specifically, the foregoing execution process is based on a prerequisite that a serving base station knows that the positioning node reference signal has been configured for the target terminal.

If the serving base station does not know whether the positioning node reference signal has been configured for the target terminal, the processing module 13 is further configured to:

before the sending module sends the terminal side measurement request based on the positioning node reference signal to the target terminal according to the configuration information of the positioning node reference signal, determine whether the positioning node reference signal has been configured for the target terminal.

When the processing module 13 has configured the positioning node reference signal for the target terminal, that the sending module 11 sends the terminal side measurement request based on the positioning node reference signal to the target terminal according to the configuration information of the positioning node reference signal includes:

sending the terminal side measurement request based on the positioning node reference signal to the target terminal according to the configuration information of the configured positioning node reference signal.

When the processing module 13 has not configured the positioning node reference signal for the target terminal, the sending module 11 is further configured to send the configuration information of the positioning node reference signal to the target terminal. Correspondingly, that the sending module 11 sends the terminal side measurement request based on the positioning node reference signal to the target terminal according to the configuration information of the positioning node reference signal includes:

sending the terminal side measurement request based on the positioning node reference signal to the target terminal according to the configuration information that is of the positioning node reference signal and sent to the target terminal.

The base station in this embodiment further includes:

a determining module, where the determining module is configured to determine, after the receiving module receives the location measurement request sent by the location server, that the target terminal is in a scenario in which a plurality of positioning nodes shares a same cell identity.

The terminal side measurement information based on the positioning node reference signal includes the cell identity, the positioning node identity or positioning node reference signal identity, and a terminal side reception-transmission time difference corresponding to the positioning node identity or positioning node reference signal identity. The base station side measurement information based on the positioning node reference signal includes the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

The positioning node reference signal in this embodiment, for example, may be a CSI-RS, or may be reference signals of different nodes that can be configured in a same cell.

The base station in this embodiment may be configured to execute the technical solution of the method embodiment shown in FIG. 1. The implementation principle thereof is similar, and is not further described herein.

In the base station provided by this embodiment, a sending module sends a terminal side measurement request based on a positioning node reference signal to a target terminal according to configuration information of the positioning node reference signal; a processing module performs a base station side measurement based on the positioning node reference signal, and obtains base station side measurement information based on the positioning node reference signal; then the sending module sends terminal side measurement information based on the positioning node reference signal and received by a receiving module and the base station side measurement information based on the positioning node reference signal to a location server, so that the location server calculates location information of the target terminal. Therefore, accurate positioning can be implemented on a terminal in a scenario in which a plurality of positioning nodes shares a same cell identity.

Figure 14:
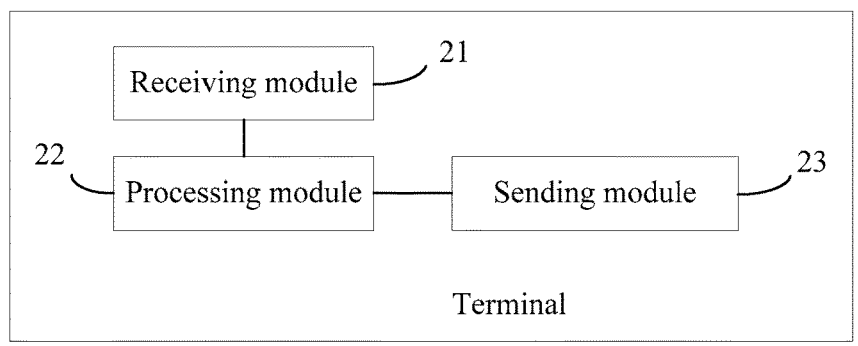
FIG. 14 is a schematic structural diagram of Embodiment 1 of a terminal according to the present disclosure.

FIG. 14 is a schematic structural diagram of Embodiment 1 of a terminal according to the present disclosure. As shown in FIG. 14, the terminal in this embodiment may include a receiving module 21, a processing module 22, and a sending module 23. The receiving module 21 is configured to receive a terminal side measurement request that is based on a positioning node reference signal and sent by a positioning apparatus according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information. The processing module 22 is configured to perform, according to the terminal side measurement request, a terminal side measurement based on the positioning node reference signal. The sending module 23 is configured to send terminal side measurement information based on the positioning node reference signal to the positioning apparatus.

The positioning apparatus may be a serving base station. In this case, the receiving module 21 is further configured to:

receive the configuration information that is of the positioning node reference signal and sent by the serving base station.

The positioning apparatus may also be a location server.

The terminal side measurement information based on the positioning node reference signal includes a cell identity, the positioning node identity or positioning node reference signal identity, and a terminal side reception-transmission time difference corresponding to the positioning node identity or positioning node reference signal identity.

The positioning node reference signal in this embodiment, for example, may be a CSI-RS, or may be reference signals of different nodes that can be configured in a same cell.

The terminal in this embodiment may be configured to execute the technical solution of the method embodiment shown in FIG. 2. The implementation principle thereof is similar, and is not further described herein.

In the terminal provided by this embodiment, after a receiving module receives a terminal side measurement request based on a positioning node reference signal and sent by a positioning apparatus, a processing module performs, according to the terminal side measurement request, a terminal side measurement based on the positioning node reference signal, and a sending module sends terminal side measurement information based on the positioning node reference signal to the positioning apparatus, so that the location apparatus calculates location information of the terminal. Therefore, accurate positioning can be implemented on a terminal in a scenario in which a plurality of positioning nodes shares a same cell identity.

Figure 15:
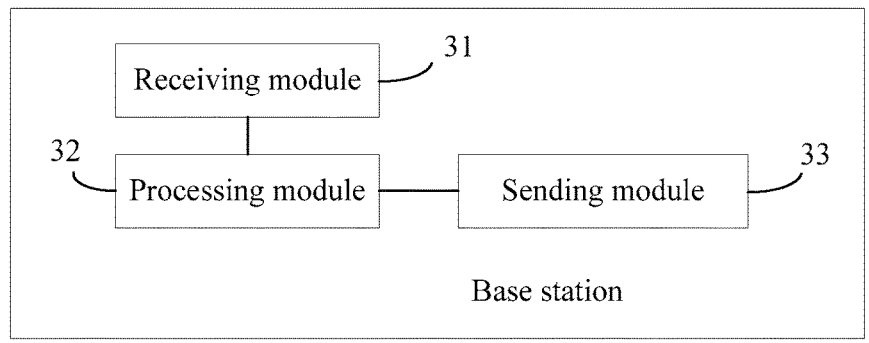
FIG. 15 is a schematic structural diagram of Embodiment 2 of a base station according to the present disclosure.

FIG. 15 is a schematic structural diagram of Embodiment 2 of a base station according to the present disclosure. As shown in FIG. 15, the base station in this embodiment may include a receiving module 31, a processing module 32, and a sending module 33. The receiving module 31 is configured to receive a base station side measurement request that is based on a positioning node reference signal and sent by a location server according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information. The processing module 32 is configured to perform, according to the base station side measurement request, a base station side measurement based on the positioning node reference signal. The sending module 33 is configured to send base station side measurement information based on the positioning node reference signal.

Specifically, the foregoing execution process is based on a prerequisite that the location server knows that a serving base station has configured the positioning node reference signal for the target terminal.

If the serving base station does not know whether the positioning node reference signal has been configured for the target terminal, the receiving module 31 is further configured to: before receiving the base station side measurement request based on the positioning node reference signal and sent by the location server, receive a request sent by the location server for the configuration information of the positioning node reference signal.

When the serving base station has configured the positioning node reference signal for the target terminal, the sending module 33 is further configured to send the configuration information of the positioning node reference signal of the target terminal to the location server.

When the serving base station has not configured the positioning node reference signal for the target terminal, the processing module 32 is further configured to configure the positioning node reference signal for the target terminal; and the sending module 33 is further configured to send the configuration information of the configured positioning node reference signal to the location server.

Still further, the foregoing execution process is based on a prerequisite that the location server knows that the target terminal is in a scenario in which a plurality of positioning nodes shares a same cell identity. If the location server does not know that the target terminal is in a scenario in which a plurality of positioning nodes shares a same cell identity, the receiving module 31 is further configured to:

receive a query request that is sent by the location server and used to confirm whether a plurality of positioning nodes shares a same cell identity within coverage of the serving base station; and the sending module 33 is further configured to send, to the location server, confirmation information used to indicate that the same cell identity is shared by the plurality of positioning nodes within the coverage of the serving base station.

The sending module 33 is further configured to:

after sending, to the location server, the confirmation information used to indicate that the same cell identity is shared by the plurality of positioning nodes within the coverage of the serving base station, send at least one piece of positioning node information to the location server, so that the location server determines, according to the positioning node information, whether the target terminal to be positioned subsequently is in a scenario in which the same cell identity is shared by the plurality of positioning nodes, where the positioning node information includes at least one of the following information:

the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The base station side measurement information based on the positioning node reference signal includes:

the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

The positioning node reference signal in this embodiment, for example, may be a CSI-RS, or may be reference signals of different nodes that can be configured in a same cell.

The base station in this embodiment may be configured to execute the technical solution of the method embodiment shown in FIG. 4. The implementation principle thereof is similar, and is not further described herein.

In the base station provided by this embodiment, after a receiving module receives a base station side measurement request that is based on a positioning node reference signal and sent by a location server according to configuration information of the positioning node reference signal, a processing module performs a base station side measurement based on the positioning node reference signal, and obtains base station side measurement information based on the positioning node reference signal; then a sending module sends the base station side measurement information based on the positioning node reference signal to the location server, so that the location server calculates location information of a target terminal. Therefore, accurate positioning can be implemented on a terminal in a scenario in which a plurality of positioning nodes shares a same cell identity.

Figure 16:
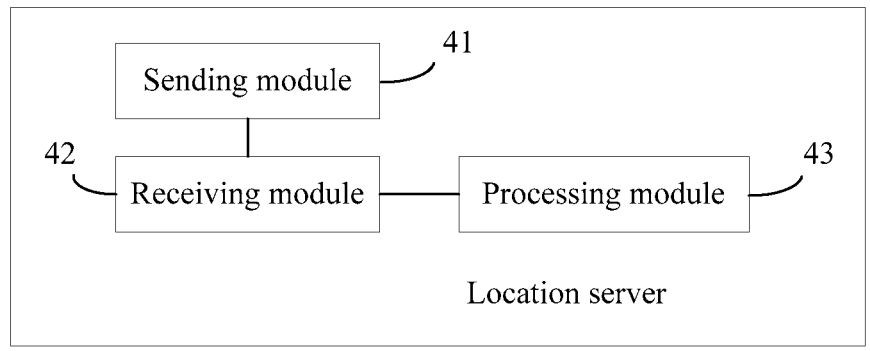
FIG. 16 is a schematic structural diagram of Embodiment 1 of a location server according to the present disclosure.

FIG. 16 is a schematic structural diagram of Embodiment 1 of a location server according to the present disclosure. As shown in FIG. 16, the location server in this embodiment may include a sending module 41, a receiving module 42, and a processing module 43. The sending module 41 is configured to send a base station side measurement request based on a positioning node reference signal to a serving base station of a target terminal according to configuration information of the positioning node reference signal, and send a terminal side measurement request based on the positioning node reference signal to the target terminal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information. The receiving module 42 is configured to receive base station side measurement information based on the positioning node reference signal and sent by the serving base station, and receive terminal side measurement information based on the positioning node reference signal and sent by the target terminal. The processing module 43 is configured to calculate location information of the target terminal according to the base station side measurement information based on the positioning node reference signal and the terminal side measurement information based on the positioning node reference signal.

Specifically, the foregoing execution process is based on a prerequisite that the location server knows that a serving base station has configured the positioning node reference signal for the target terminal. If the serving base station does not know whether the positioning node reference signal has been configured for the target terminal, the sending module 41 is further configured to: before sending the base station side measurement request based on the positioning node reference signal to the serving base station of the target terminal, send a request for the configuration information of the positioning node reference signal to the serving base station; and the receiving module 42 is further configured to receive the configuration information that is of the positioning node reference signal of the target terminal and sent by the serving base station.

The sending module 41 is further configured to send, to the serving base station, a query request used to confirm whether a plurality of positioning nodes shares a same cell identity within coverage of the serving base station; and the receiving module 42 is further configured to receive confirmation information sent by the serving base station and used to indicate that the same cell identity is shared by the plurality of positioning nodes within the coverage of the serving base station.

The receiving module 42 is further configured to: after receiving the confirmation information, receive at least one piece of positioning node information sent by the serving base station, so that the location server determines, according to the positioning node information, whether the target terminal to be positioned subsequently is in a scenario in which the same cell identity is shared by the plurality of positioning nodes, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The terminal side measurement information based on the positioning node reference signal includes the cell identity, the positioning node identity or positioning node reference signal identity, and a terminal side reception-transmission time difference corresponding to the positioning node identity or positioning node reference signal identity. The base station side measurement information based on the positioning node reference signal includes the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

The positioning node reference signal in this embodiment, for example, may be a CSI-RS, or may be reference signals of different nodes that can be configured in a same cell.

The location server in this embodiment may be configured to execute the technical solution of the method embodiment shown in FIG. 5. The implementation principle thereof is similar, and is not further described herein.

In the location server provided by this embodiment, a sending module sends a base station side measurement request based on a positioning node reference signal to a serving base station of a target terminal according to configuration information of the positioning node reference signal, and sends a terminal side measurement request based on the positioning node reference signal to the target terminal; then a receiving module receives base station side measurement information based on the positioning node reference signal and terminal side measurement information based on the positioning node reference signal; and finally, location information of the target terminal is calculated. Therefore, accurate positioning can be implemented on a terminal in a scenario in which a plurality of positioning nodes shares a same cell identity.

Figure 17:
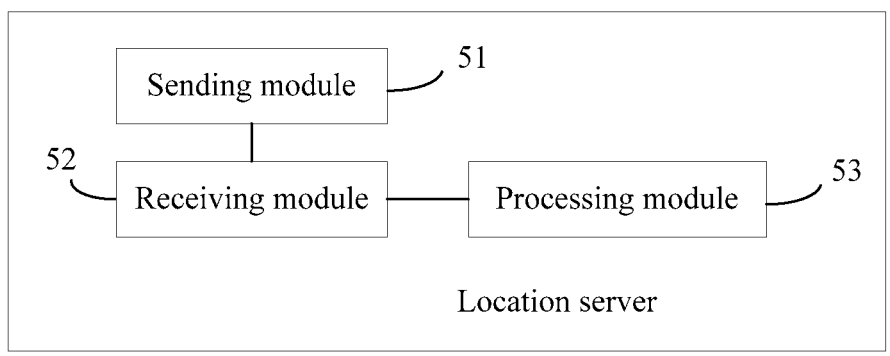
FIG. 17 is a schematic structural diagram of Embodiment 2 of a location server according to the present disclosure.

FIG. 17 is a schematic structural diagram of Embodiment 2 of a location server according to the present disclosure. As shown in FIG. 17, the location server in this embodiment may include a sending module 51, a receiving module 52, and a processing module 53. The sending module 51 is configured to send a location measurement request based on a positioning node reference signal in location assistance information to a target terminal, so that the target terminal performs a reference signal time difference RSTD measurement based on the positioning node reference signal, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information. The receiving module 52 is configured to receive RSTD measurement information based on the positioning node reference signal and sent by the target terminal. The processing module 53 is configured to calculate location information of the target terminal according to the RSTD measurement information based on the positioning node reference signal.

The sending module 51 is further configured to: before sending the location measurement request based on the positioning node reference signal in the location assistance information to the target terminal, send the location assistance information to the target terminal.

The sending module 51 is further configured to:

before sending the location assistance information to the target terminal, send a request for the configuration information of the positioning node reference signal to the serving base station; and the receiving module 52 is further configured to receive the configuration information that is of the positioning node reference signal of the target terminal and sent by the serving base station.

The receiving module 52 is further configured to: after the location measurement request based on the positioning node reference signal in the location assistance information is sent to the target terminal, receive a request sent by the target terminal for the location assistance information; and the sending module 51 is further configured to send the location assistance information to the target terminal.

The sending module 51 is further configured to:

before sending the location measurement request based on the positioning node reference signal in the location assistance information to the target terminal, send a request for the configuration information of the positioning node reference signal to the serving base station; and the receiving module 52 is further configured to receive the configuration information that is of the positioning node reference signal of the target terminal and sent by the serving base station.

In the foregoing embodiment, the sending module 51 is further configured to:

send, to the serving base station, a query request used to confirm whether the same cell identity is shared by a plurality of positioning nodes within the coverage of the serving base station; and the receiving module 52 is further configured to receive confirmation information sent by the serving base station and used to indicate that the same cell identity is shared by the plurality of positioning nodes within the coverage of the serving base station.

The receiving module 52 is further configured to: after receiving the confirmation information, receive at least one piece of positioning node information sent by the serving base station, so that the location server determines, according to the positioning node information, whether the target terminal to be positioned subsequently is in a scenario in which the same cell identity is shared by the plurality of positioning nodes, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The query request is included in a cell location information request, and the confirmation information is included in cell location information, where the cell location information includes at least the cell identity, a tracking area code, an absolute carrier frequency and transmission bandwidth of a cell positioning reference signal corresponding to the cell identity, a transmission timing, a quantity of transmission subframes, a transmit antenna port, and location information of an access point that sends the cell positioning reference signal corresponding to the cell identity.

The RSTD measurement information based on the positioning node reference signal includes: a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

The positioning node reference signal in this embodiment, for example, may be a CSI-RS, or may be reference signals of different nodes that can be configured in a same cell.

The location server in this embodiment may be configured to execute the technical solution of the method embodiment shown in FIG. 8. The implementation principle thereof is similar, and is not further described herein.

In the location server provided by this embodiment, a sending module sends a location measurement request based on a positioning node reference signal in location assistance information to a target terminal, so that the target terminal performs an RSTD measurement based on the positioning node reference signal; then a receiving module receives RSTD measurement information based on the positioning node reference signal and sent by the target terminal; and a processing module calculates location information of the target terminal according to the RSTD measurement information based on the positioning node reference signal. Therefore, accurate positioning can be implemented on a terminal in a scenario in which a plurality of positioning nodes shares a same cell identity.

Figure 18:
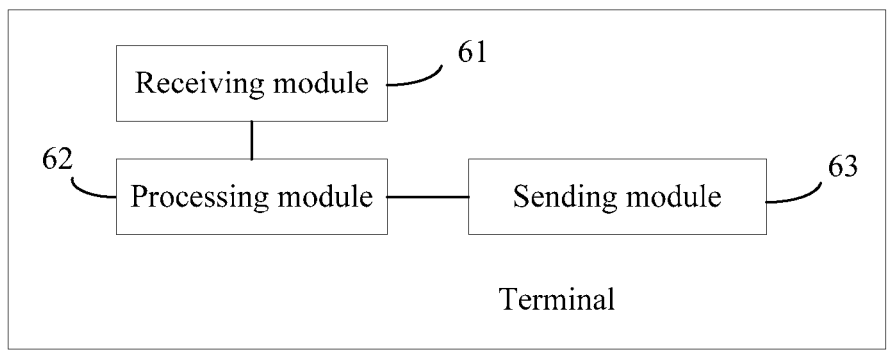
FIG. 18 is a schematic structural diagram of Embodiment 2 of a terminal according to the present disclosure.

FIG. 18 is a schematic structural diagram of Embodiment 2 of a terminal according to the present disclosure. As shown in FIG. 18, the terminal in this embodiment may include a receiving module 61, a processing module 62, and a sending module 63.

The receiving module 61 is configured to receive a location measurement request based on a positioning node reference signal in location assistance information and sent by a location server, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information.

The processing module 62 is configured to perform a reference signal time difference RSTD measurement based on the positioning node reference signal. The sending module 63 is configured to send RSTD measurement information based on the positioning node reference signal to the location server, so that the location server performs location calculation according to the RSTD measurement information based on the positioning node reference signal.

In an optional implementation manner, the receiving module 61 is further configured to:

before receiving the location measurement request based on the positioning node reference signal in the location assistance information and sent by the location server, receive the location assistance information sent by the location server.

The sending module 63 is further configured to: after the receiving module 61 receives the location measurement request based on the positioning node reference signal in the location assistance information and sent by the location server, send a request for the location assistance information to the location server; and the receiving module 61 is further configured to receive the location assistance information sent by the location server.

The RSTD measurement information based on the positioning node reference signal includes:

a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

The positioning node reference signal in this embodiment, for example, may be a CSI-RS, or may be reference signals of different nodes that can be configured in a same cell.

The terminal in this embodiment may be configured to execute the technical solution of the method embodiment shown in FIG. 9. The implementation principle thereof is similar, and is not further described herein.

In the terminal provided by this embodiment, after a receiving module receives a location measurement request based on a positioning node reference signal in location assistance information and sent by a location server, a processing module performs an RSTD measurement based on the positioning node reference signal; then a sending module sends RSTD measurement information based on the positioning node reference signal to the location server, so that the location server calculates location information of the terminal according to the RSTD measurement information based on the positioning node reference signal. Therefore, accurate positioning can be implemented on a terminal in a scenario in which a plurality of positioning nodes shares a same cell identity.

Figure 19:
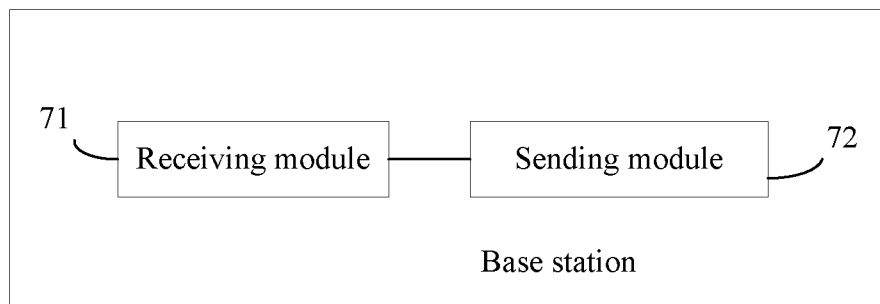
FIG. 19 is a schematic structural diagram of Embodiment 3 of a base station according to the present disclosure.

FIG. 19 is a schematic structural diagram of Embodiment 3 of a base station according to the present disclosure. As shown in FIG. 19, the base station in this embodiment may include a receiving module 71 and a sending module 72. The receiving module 71 is configured to receive a request sent by a location server for configuration information of a positioning node reference signal. The sending module 72 is configured to send configuration information of a positioning node reference signal of a target terminal to the location server, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information.

Specifically, that the sending module 72 sends the configuration information of the positioning node reference signal of the target terminal to the location server includes:

when the base station has configured the positioning node reference signal for the target terminal, the sending module 72 sends the configuration information of the positioning node reference signal of the target terminal to the location server; or when the base station has not configured the positioning node reference signal for the target terminal, the base station further includes:

a processing module, configured to configure the positioning node reference signal for the target terminal; where the sending module 72 is configured to send the configuration information of the configured positioning node reference signal to the location server.

The receiving module 71 is further configured to receive a query request that is sent by the location server and used to confirm whether a plurality of positioning nodes shares a same cell identity within coverage of the serving base station; and the sending module 72 is further configured to send, to the location server, confirmation information used to indicate that the same cell identity is shared by the plurality of positioning nodes within the coverage of the serving base station.

The sending module 72 is further configured to: after sending the confirmation information to the location server, send at least one piece of positioning node information to the location server, where the positioning node information includes any one or a combination of the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The query request is included in a cell location information request, and the confirmation information is included in cell location information, where the cell location information includes at least the cell identity, a tracking area code, an absolute carrier frequency and transmission bandwidth of a cell positioning reference signal corresponding to the cell identity, a transmission timing, a quantity of transmission subframes, a transmit antenna port, and location information of an access point that sends the cell positioning reference signal corresponding to the cell identity.

The positioning node reference signal in this embodiment, for example, may be a CSI-RS, or may be reference signals of different nodes that can be configured in a same cell.

The base station in this embodiment may be configured to execute the technical solution of the method embodiment shown in FIG. 10. The implementation principle thereof is similar, and is not further described herein.

In the base station provided by this embodiment, after a receiving module receives a request sent by a location server for configuration information of a positioning node reference signal, a sending module sends configuration information of a positioning node reference signal of a target terminal to the location server, so that the location server obtains the configuration information of the positioning node reference signal of the target terminal, which may further help the location server to accurately position the terminal in a scenario in which a plurality of positioning nodes shares a same cell identity.

Figure 20:
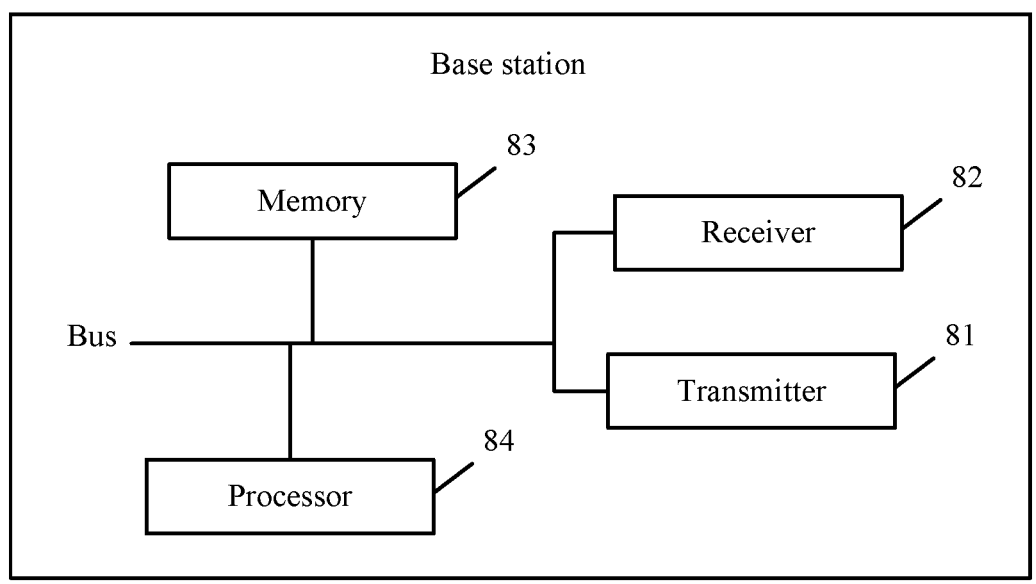
FIG. 20 is a schematic structural diagram of Embodiment 4 of a base station according to the present disclosure.

FIG. 20 is a schematic structural diagram of Embodiment 4 of a base station according to the present disclosure. As shown in FIG. 20, the base station in this embodiment may include a transmitter 81, a receiver 82, a memory 83, and a processor 84. In the embodiment of the present disclosure, the transmitter 81, the receiver 82, the memory 83, and the processor 84 may be connected by using a bus or in other manners, for example, connected by using a bus in FIG. 20.

The transmitter 81 is configured to send, after a location measurement request sent by a location server is received, a terminal side measurement request based on a positioning node reference signal to a target terminal according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information. The receiver 82 is configured to receive terminal side measurement information based on the positioning node reference signal and sent by the target terminal.

The memory 83 is configured to store program code. The processor 84 is configured to invoke the program code stored in the memory 83 to perform the following step: performing a base station side measurement based on the positioning node reference signal, and obtaining base station side measurement information based on the positioning node reference signal. The transmitter 81 is further configured to send the terminal side measurement information based on the positioning node reference signal and the base station side measurement information based on the positioning node reference signal to the location server, so that the location server calculates location information of the target terminal.

Specifically, the foregoing execution process is based on a prerequisite that the serving base station knows that the positioning node reference signal has been configured for the target terminal.

If the serving base station does not know whether the positioning node reference signal has been configured for the target terminal, the processor 84 is further configured to:

before the transmitter sends the terminal side measurement request based on the positioning node reference signal to the target terminal according to the configuration information of the positioning node reference signal, determine whether the positioning node reference signal has been configured for the target terminal.

When the processor 84 has configured the positioning node reference signal for the target terminal, that the transmitter 81 sends the terminal side measurement request based on the positioning node reference signal to the target terminal according to the configuration information of the positioning node reference signal includes:

sending the terminal side measurement request based on the positioning node reference signal to the target terminal according to the configuration information of the configured positioning node reference signal.

When the processor 84 has not configured the positioning node reference signal for the target terminal, the transmitter 81 is further configured to send the configuration information of the positioning node reference signal to the target terminal. Correspondingly, that the transmitter 81 sends the terminal side measurement request based on the positioning node reference signal to the target terminal according to the configuration information of the positioning node reference signal includes:

sending the terminal side measurement request based on the positioning node reference signal to the target terminal according to the configuration information that is of the positioning node reference signal and sent to the target terminal.

The processor 84 is further configured to determine, after the receiver 82 receives the location measurement request sent by the location server, that the target terminal is in a scenario in which a plurality of positioning nodes shares a same cell identity.

The terminal side measurement information based on the positioning node reference signal includes the cell identity, the positioning node identity or positioning node reference signal identity, and a terminal side reception-transmission time difference corresponding to the positioning node identity or positioning node reference signal identity. The base station side measurement information based on the positioning node reference signal includes the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

The positioning node reference signal in this embodiment, for example, may be a CSI-RS, or may be reference signals of different nodes that can be configured in a same cell.

The base station in this embodiment may be configured to execute the technical solution of the method embodiment shown in FIG. 1. The implementation principle thereof is similar, and is not further described herein.

In the base station provided by this embodiment, a transmitter sends a terminal side measurement request based on a positioning node reference signal to a target terminal according to configuration information of the positioning node reference signal; a processor performs a base station side measurement based on the positioning node reference signal, and obtains base station side measurement information based on the positioning node reference signal; then the transmitter sends terminal side measurement information based on the positioning node reference signal and received by a receiver and the base station side measurement information based on the positioning node reference signal to a location server, so that the location server calculates location information of the target terminal. Therefore, accurate positioning can be implemented on a terminal in a scenario in which a plurality of positioning nodes shares a same cell identity.

Figure 21:
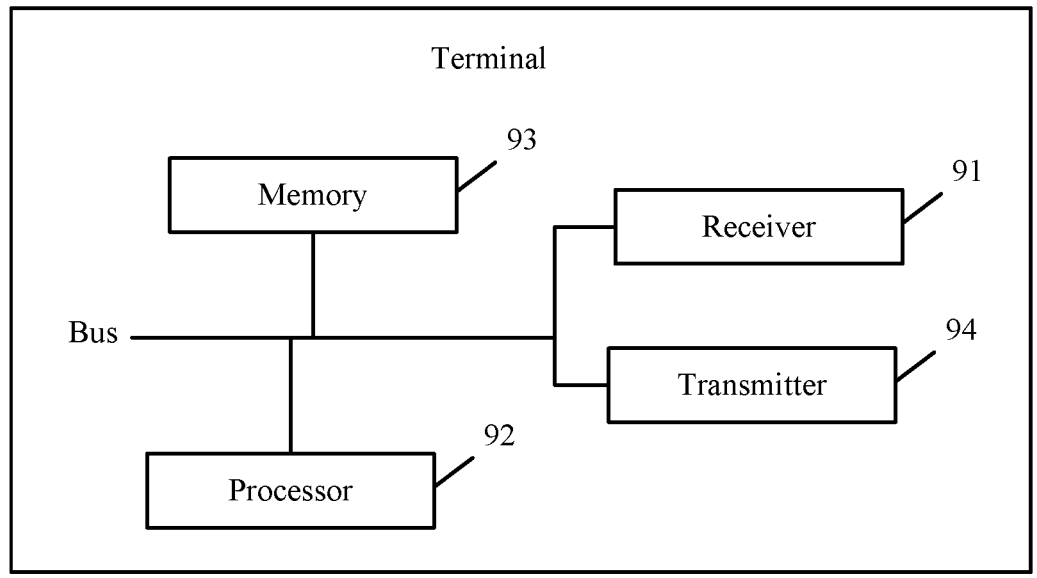
FIG. 21 is a schematic structural diagram of Embodiment 3 of a terminal according to the present disclosure.

FIG. 21 is a schematic structural diagram of Embodiment 3 of a terminal according to the present disclosure. As shown in FIG. 21, the terminal in this embodiment may include a receiver 91, a processor 92, a memory 93, and a transmitter 94. In the embodiment of the present disclosure, the receiver 91, the processor 92, the memory 93, and the transmitter 94 may be connected by using a bus or in other manners, for example, connected by using a bus in FIG. 21.

The receiver 91 is configured to receive a terminal side measurement request that is based on a positioning node reference signal and sent by a positioning apparatus according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information. The memory 93 is configured to store program code. The processor 92 is configured to invoke the program code stored in the memory 93 to perform the following step: performing, according to the terminal side measurement request, a terminal side measurement based on the positioning node reference signal. The transmitter 94 is configured to send terminal side measurement information based on the positioning node reference signal to the positioning apparatus.

The positioning apparatus may be a serving base station. In this case, the receiver 91 is further configured to:

receive the configuration information that is of the positioning node reference signal and sent by the serving base station.

The positioning apparatus may also be a location server.

The terminal side measurement information based on the positioning node reference signal includes a cell identity, the positioning node identity or positioning node reference signal identity, and a terminal side reception-transmission time difference corresponding to the positioning node identity or positioning node reference signal identity.

The positioning node reference signal in this embodiment, for example, may be a CSI-RS, or may be reference signals of different nodes that can be configured in a same cell.

The terminal in this embodiment may be configured to execute the technical solution of the method embodiment shown in FIG. 2. The implementation principle thereof is similar, and is not further described herein.

In the terminal provided by this embodiment, after a receiver receives a terminal side measurement request based on a positioning node reference signal and sent by a positioning apparatus, a processor performs, according to the terminal side measurement request, a terminal side measurement based on the positioning node reference signal, and a transmitter sends terminal side measurement information based on the positioning node reference signal to the positioning apparatus, so that the location apparatus calculates location information of the terminal. Therefore, accurate positioning can be implemented on a terminal in a scenario in which a plurality of positioning nodes shares a same cell identity.

Figure 22:
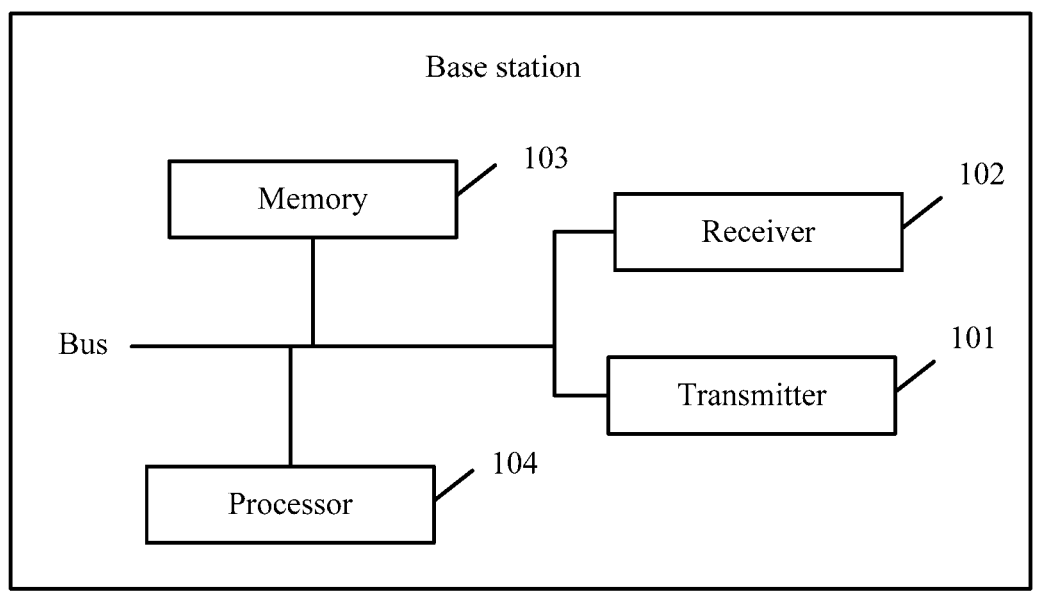
FIG. 22 is a schematic structural diagram of Embodiment 5 of a base station according to the present disclosure.

FIG. 22 is a schematic structural diagram of Embodiment 5 of a base station according to the present disclosure. As shown in FIG. 22, the base station in this embodiment may include a transmitter 101, a receiver 102, a memory 103, and a processor 104. In the embodiment of the present disclosure, the transmitter 101, the receiver 102, the memory 103, and the processor 104 may be connected by using a bus or in other manners, for example, connected by using a bus in FIG. 22.

The receiver 102 is configured to receive a base station side measurement request that is based on a positioning node reference signal and sent by a location server according to configuration information of the positioning node reference signal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information. The memory 103 is configured to store program code. The processor 104 is configured to invoke the program code stored in the memory 103 to perform the following step: performing, according to the base station side measurement request, a base station side measurement based on the positioning node reference signal. The transmitter 101 is configured to send base station side measurement information based on the positioning node reference signal.

Specifically, the foregoing execution process is based on a prerequisite that the location server knows that a serving base station has configured the positioning node reference signal for the target terminal.

If the serving base station does not know whether the positioning node reference signal has been configured for the target terminal, the receiver 102 is further configured to: before receiving the base station side measurement request based on the positioning node reference signal and sent by the location server, receive a request sent by the location server for the configuration information of the positioning node reference signal.

When the serving base station has configured the positioning node reference signal for the target terminal, the transmitter 101 is further configured to send the configuration information of the positioning node reference signal of the target terminal to the location server.

When the serving base station has not configured the positioning node reference signal for the target terminal, the processor 104 is further configured to configure the positioning node reference signal for the target terminal; and the transmitter 101 is further configured to send the configuration information of the configured positioning node reference signal to the location server.

Still further, the foregoing execution process is based on a prerequisite that the location server knows that the target terminal is in a scenario in which a plurality of positioning nodes shares a same cell identity.

If the location server does not know that the target terminal is in a scenario in which a plurality of positioning nodes shares a same cell identity, the receiver 102 is further configured to:

receive a query request that is sent by the location server and used to confirm whether a plurality of positioning nodes shares a same cell identity within coverage of the serving base station; and the transmitter 101 is further configured to send, to the location server, confirmation information used to indicate that the same cell identity is shared by the plurality of positioning nodes within the coverage of the serving base station.

The transmitter 101 is further configured to:

after sending, to the location server, the confirmation information used to indicate that the same cell identity is shared by the plurality of positioning nodes within the coverage of the serving base station, send at least one piece of positioning node information to the location server, so that the location server determines, according to the positioning node information, whether the target terminal to be positioned subsequently is in a scenario in which the same cell identity is shared by the plurality of positioning nodes, where the positioning node information includes at least one of the following information:

the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The base station side measurement information based on the positioning node reference signal includes:

the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

The positioning node reference signal in this embodiment, for example, may be a CSI-RS, or may be reference signals of different nodes that can be configured in a same cell.

The base station in this embodiment may be configured to execute the technical solution of the method embodiment shown in FIG. 4. The implementation principle thereof is similar, and is not further described herein.

In the base station provided by this embodiment, after a receiver receives a base station side measurement request that is based on a positioning node reference signal and sent by a location server according to configuration information of the positioning node reference signal, a processor performs a base station side measurement based on the positioning node reference signal, and obtains base station side measurement information based on the positioning node reference signal; then a transmitter sends the base station side measurement information based on the positioning node reference signal to the location server, so that the location server calculates location information of a target terminal. Therefore, accurate positioning can be implemented on a terminal in a scenario in which a plurality of positioning nodes shares a same cell identity.

Figure 23:
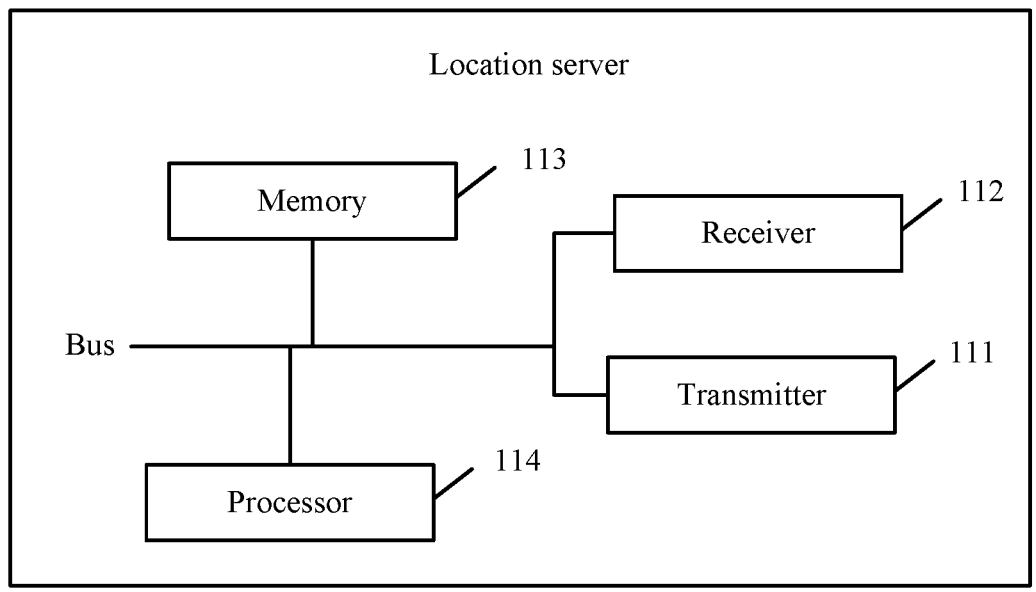
FIG. 23 is a schematic structural diagram of Embodiment 3 of a location server according to the present disclosure.

FIG. 23 is a schematic structural diagram of Embodiment 3 of a location server according to the present disclosure. As shown in FIG. 23, the location server in this embodiment may include a transmitter 111, a receiver 112, a memory 113, and a processor 114. In the embodiment of the present disclosure, the transmitter 111, the receiver 112, the memory 113, and the processor 114 may be connected by using a bus or in other manners, for example, connected by using a bus in FIG. 23.

The transmitter 111 is configured to send a base station side measurement request based on a positioning node reference signal to a serving base station of a target terminal according to configuration information of the positioning node reference signal, and send a terminal side measurement request based on the positioning node reference signal to the target terminal, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information. The receiver 112 is configured to receive base station side measurement information based on the positioning node reference signal and sent by the serving base station, and receive terminal side measurement information based on the positioning node reference signal and sent by the target terminal. The memory 113 is configured to store program code. The processor 114 is configured to invoke the program code stored in the memory 113 to perform the following step: calculating location information of the target terminal according to the base station side measurement information based on the positioning node reference signal and the terminal side measurement information based on the positioning node reference signal.

Specifically, the foregoing execution process is based on a prerequisite that the location server knows that a serving base station has configured the positioning node reference signal for the target terminal.

If the serving base station does not know whether the positioning node reference signal has been configured for the target terminal, the transmitter 111 is further configured to: before sending the base station side measurement request based on the positioning node reference signal to the serving base station of the target terminal, send a request for the configuration information of the positioning node reference signal to the serving base station; and the receiver 112 is further configured to receive the configuration information that is of the positioning node reference signal of the target terminal and sent by the serving base station.

The transmitter 111 is further configured to send, to the serving base station, a query request used to confirm whether a plurality of positioning nodes shares a same cell identity within coverage of the serving base station; and the receiver 112 is further configured to receive confirmation information sent by the serving base station and used to indicate that the same cell identity is shared by the plurality of positioning nodes within the coverage of the serving base station.

The receiver 112 is further configured to: after receiving the confirmation information, receive at least one piece of positioning node information sent by the serving base station, so that the location server determines, according to the positioning node information, whether the target terminal to be positioned subsequently is in a scenario in which the same cell identity is shared by the plurality of positioning nodes, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The terminal side measurement information based on the positioning node reference signal includes the cell identity, the positioning node identity or positioning node reference signal identity, and a terminal side reception-transmission time difference corresponding to the positioning node identity or positioning node reference signal identity. The base station side measurement information based on the positioning node reference signal includes the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

The positioning node reference signal in this embodiment, for example, may be a CSI-RS, or may be reference signals of different nodes that can be configured in a same cell.

The location server in this embodiment may be configured to execute the technical solution of the method embodiment shown in FIG. 5. The implementation principle thereof is similar, and is not further described herein.

In the location server provided by this embodiment, a transmitter sends a base station side measurement request based on a positioning node reference signal to a serving base station of a target terminal according to configuration information of the positioning node reference signal, and sends a terminal side measurement request based on the positioning node reference signal to the target terminal; then a receiver receives base station side measurement information based on the positioning node reference signal and terminal side measurement information based on the positioning node reference signal; and finally, a processor calculates location information of the target terminal. Therefore, accurate positioning can be implemented on a terminal in a scenario in which a plurality of positioning nodes shares a same cell identity.

Figure 24:
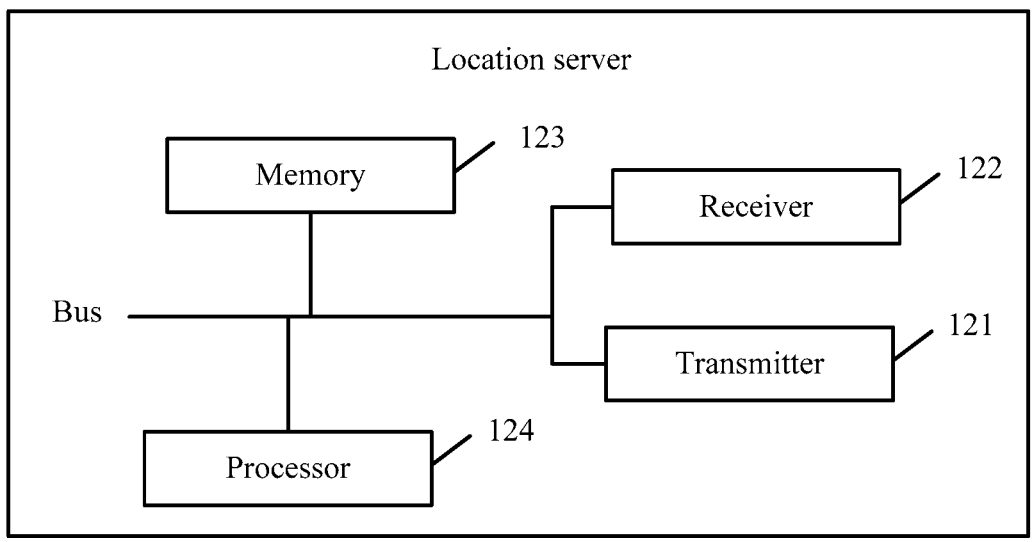
FIG. 24 is a schematic structural diagram of Embodiment 4 of a location server according to the present disclosure.

FIG. 24 is a schematic structural diagram of Embodiment 4 of a location server according to the present disclosure. As shown in FIG. 24, the location server in this embodiment may include a transmitter 121, a receiver 122, a memory 123, and a processor 124. In the embodiment of the present disclosure, the transmitter 121, the receiver 122, the memory 123, and the processor 124 may be connected by using a bus or in other manners, for example, connected by using a bus in FIG. 24.

The transmitter 121 is configured to send a location measurement request based on a positioning node reference signal in location assistance information to a target terminal, so that the target terminal performs a reference signal time difference RSTD measurement based on the positioning node reference signal, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information. The receiver 122 is configured to receive RSTD measurement information based on the positioning node reference signal and sent by the target terminal. The memory 123 is configured to store program code. The processor 124 is configured to invoke the program code stored in the memory 123 to perform the following step: calculating location information of the target terminal according to the RSTD measurement information based on the positioning node reference signal.

The transmitter 121 is further configured to: before sending the location measurement request based on the positioning node reference signal in the location assistance information to the target terminal, send the location assistance information to the target terminal.

The transmitter 121 is further configured to:
before sending the location assistance information to the target terminal, send a request for the configuration information of the positioning node reference signal to the serving base station; and the receiver 122 is further configured to receive the configuration information that is of the positioning node reference signal of the target terminal and sent by the serving base station.

The receiver 122 is further configured to: after the location measurement request based on the positioning node reference signal in the location assistance information is sent to the target terminal, receive a request sent by the target terminal for the location assistance information; and the transmitter 121 is further configured to send the location assistance information to the target terminal.

The transmitter 121 is further configured to:
before sending the location measurement request based on the positioning node reference signal in the location assistance information to the target terminal, send a request for the configuration information of the positioning node reference signal to the serving base station; and the receiver 122 is further configured to receive the configuration information that is of the positioning node reference signal of the target terminal and sent by the serving base station.

In the foregoing embodiment, the transmitter 121 is further configured to:
send, to the serving base station, a query request used to confirm whether the same cell identity is shared by a plurality of positioning nodes within the coverage of the serving base station; and the receiver 122 is further configured to receive confirmation information sent by the serving base station and used to indicate that the same cell identity is shared by the plurality of positioning nodes within the coverage of the serving base station.

The receiver 122 is further configured to: after receiving the confirmation information, receive at least one piece of positioning node information sent by the serving base station, so that the location server determines, according to the positioning node information, whether the target terminal to be positioned subsequently is in a scenario in which the same cell identity is shared by the plurality of positioning nodes, where the positioning node information includes at least one of the following information: the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The query request is included in a cell location information request, and the confirmation information is included in cell location information, where the cell location information includes at least the cell identity, a tracking area code, an absolute carrier frequency and transmission bandwidth of a cell positioning reference signal corresponding to the cell identity, a transmission timing, a quantity of transmission subframes, a transmit antenna port, and location information of an access point that sends the cell positioning reference signal corresponding to the cell identity.

The RSTD measurement information based on the positioning node reference signal includes: a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

The positioning node reference signal in this embodiment, for example, may be a CSI-RS, or may be reference signals of different nodes that can be configured in a same cell.

The location server in this embodiment may be configured to execute the technical solution of the method embodiment shown in FIG. 8. The implementation principle thereof is similar, and is not further described herein.

In the location server provided by this embodiment, a transmitter sends a location measurement request based on a positioning node reference signal in location assistance information to a target terminal, so that the target terminal performs an RSTD measurement based on the positioning node reference signal; then a receiver receives RSTD measurement information based on the positioning node reference signal and sent by the target terminal; and a processor calculates location information of the target terminal according to the RSTD measurement information based on the positioning node reference signal. Therefore, accurate positioning can be implemented on a terminal in a scenario in which a plurality of positioning nodes shares a same cell identity.

Figure 25:
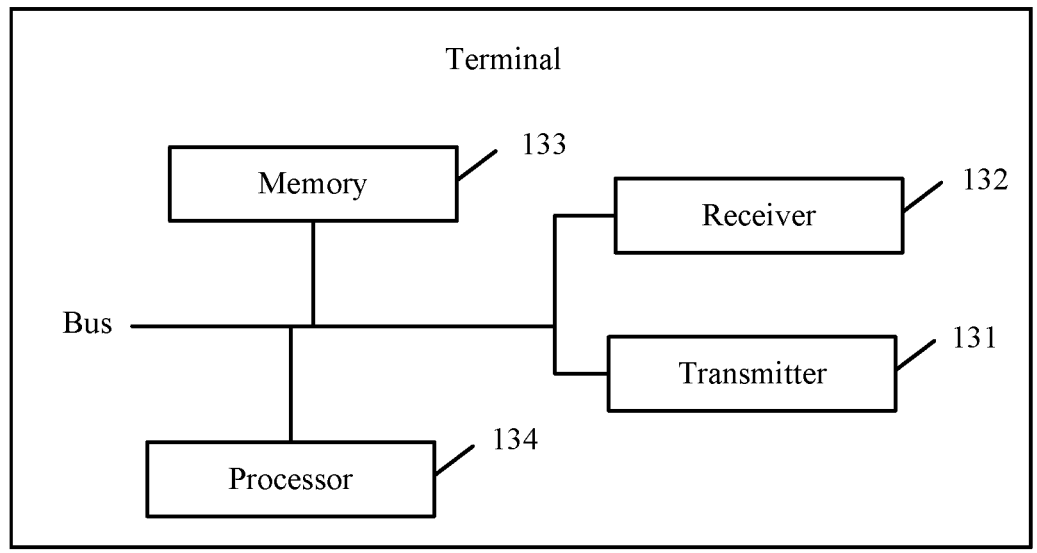
FIG. 25 is a schematic structural diagram of Embodiment 4 of a terminal according to the present disclosure.

FIG. 25 is a schematic structural diagram of Embodiment 4 of a terminal according to the present disclosure. As shown in FIG. 25, the terminal in this embodiment may include a transmitter 131, a receiver 132, a memory 133, and a processor 134. In the embodiment of the present disclosure, the transmitter 131, the receiver 132, the memory 133, and the processor 134 may be connected by using a bus or in other manners, for example, connected by using a bus in FIG. 25.

The receiver 132 is configured to receive a location measurement request based on a positioning node reference signal in location assistance information and sent by a location server, where the location assistance information includes configuration information of the positioning node reference signal within coverage of a serving base station of the target terminal, where the configuration information of the positioning node reference signal includes a cell identity, a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information.

The memory 133 is configured to store program code. The processor 134 is configured to invoke the program code stored in the memory 133 to perform the following step: performing a reference signal time difference RSTD measurement based on the positioning node reference signal. The transmitter 131 is configured to send RSTD measurement information based on the positioning node reference signal to the location server, so that the location server performs location calculation according to the RSTD measurement information based on the positioning node reference signal.

In an optional implementation manner, the receiver 132 is further configured to:

before receiving the location measurement request based on the positioning node reference signal in the location assistance information and sent by the location server, receive the location assistance information sent by the location server.

The transmitter 131 is further configured to: after the receiver 132 receives the location measurement request based on the positioning node reference signal in the location assistance information and sent by the location server, send a request for the location assistance information to the location server; and the receiver 132 is further configured to receive the location assistance information sent by the location server.

The RSTD measurement information based on the positioning node reference signal includes:

a first cell identity, a first positioning node identity or a first positioning node reference signal identity, a second cell identity, a second positioning node identity or a second positioning node reference signal identity, and RSTD measurement values corresponding to the first positioning node identity or first positioning node reference signal identity and the second positioning node identity or second positioning node reference signal identity.

The positioning node reference signal in this embodiment, for example, may be a CSI-RS, or may be reference signals of different nodes that can be configured in a same cell.

The terminal in this embodiment may be configured to execute the technical solution of the method embodiment shown in FIG. 9. The implementation principle thereof is similar, and is not further described herein.

In the terminal provided by this embodiment, after a receiver receives a location measurement request based on a positioning node reference signal in location assistance information and sent by a location server, a processor performs an RSTD measurement based on the positioning node reference signal; then a transmitter sends RSTD measurement information based on the positioning node reference signal to the location server, so that the location server calculates location information of the terminal according to the RSTD measurement information based on the positioning node reference signal. Therefore, accurate positioning can be implemented on a terminal in a scenario in which a plurality of positioning nodes shares a same cell identity.

Figure 26:
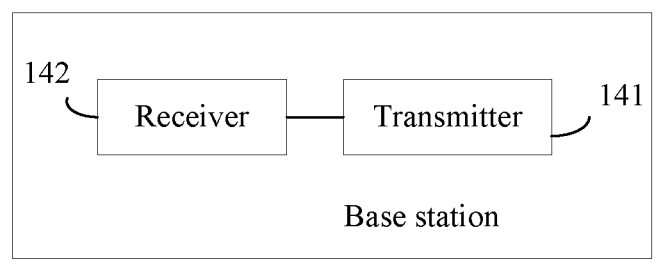
FIG. 26 is a schematic structural diagram of Embodiment 6 of a base station according to the present disclosure.

FIG. 26 is a schematic structural diagram of Embodiment 6 of a base station according to the present disclosure. As shown in FIG. 26, the base station in this embodiment may include a receiver 142 and a transmitter 141. The receiver 142 is configured to receive a request sent by a location server for configuration information of a positioning node reference signal. The transmitter 141 is configured to send configuration information of a positioning node reference signal of a target terminal to the location server, where the configuration information of the positioning node reference signal includes a positioning node identity or a positioning node reference signal identity, a transmission timing of the positioning node reference signal, a transmission period of the positioning node reference signal, a frequency-domain transmission position of the positioning node reference signal, and antenna port information. Optionally, the configuration information of the positioning node reference signal further includes transmit power information.

Specifically, that the transmitter 141 sends the configuration information of the positioning node reference signal of the target terminal to the location server includes:

when the base station has configured the positioning node reference signal for the target terminal, the transmitter 141 sends the configuration information of the positioning node reference signal of the target terminal to the location server; or when the base station has not configured the positioning node reference signal for the target terminal, the base station further includes:

a processor, where the processor is configured to configure the positioning node reference signal for the target terminal; where the transmitter 141 is configured to send the configuration information of the configured positioning node reference signal to the location server.

The receiver 142 is further configured to receive a query request that is sent by the location server and used to confirm whether a plurality of positioning nodes shares a same cell identity within coverage of the serving base station; and the transmitter 141 is further configured to send, to the location server, confirmation information used to indicate that the same cell identity is shared by the plurality of positioning nodes within the coverage of the serving base station.

The transmitter 141 is further configured to: after sending the confirmation information to the location server, send at least one piece of positioning node information to the location server, where the positioning node information includes any one or a combination of the cell identity, the positioning node identity or positioning node reference signal identity, a node antenna port corresponding to the positioning node identity or positioning node reference signal identity, a node geographic location corresponding to the positioning node identity or positioning node reference signal identity, and node absolute carrier frequency information corresponding to the positioning node identity or positioning node reference signal identity.

The query request is included in a cell location information request, and the confirmation information is included in cell location information, where the cell location information includes at least the cell identity, a tracking area code, an absolute carrier frequency and transmission bandwidth of a cell positioning reference signal corresponding to the cell identity, a transmission timing, a quantity of transmission subframes, a transmit antenna port, and location information of an access point that sends the cell positioning reference signal corresponding to the cell identity.

The positioning node reference signal in this embodiment, for example, may be a CSI-RS, or may be reference signals of different nodes that can be configured in a same cell.

The base station in this embodiment may be configured to execute the technical solution of the method embodiment shown in FIG. 10. The implementation principle thereof is similar, and is not further described herein.

In the base station provided by this embodiment, after a receiver receives a request sent by a location server for configuration information of a positioning node reference signal, a transmitter sends configuration information of a positioning node reference signal of a target terminal to the location server, so that the location server obtains the configuration information of the positioning node reference signal of the target terminal, which may further help the location server to accurately position the terminal in a scenario in which a plurality of positioning nodes shares a same cell identity.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A base station, comprising:
a transmitter, configured to send, after a location measurement request is received from a location server a terminal side measurement request based on a positioning node reference signal to a target terminal according to configuration information of the positioning node reference signal, wherein the target terminal is in a scenario in which a plurality of positioning nodes shares a same cell identity, wherein the configuration information of the positioning node reference signal comprises a transmission timing of the positioning node reference signal, a transmission period of the positioning node reference signal, and a frequency-domain transmission position of the positioning node reference signal, and wherein the configuration information of the positioning node reference signal further comprises a positioning node identity or a positioning node reference signal identity;
a receiver, configured to receive, from the target terminal, terminal side measurement information based on the positioning node reference signal; and
a processor, configured to perform a base station side measurement based on the positioning node reference signal, and obtain base station side measurement information based on the positioning node reference signal;
wherein the transmitter is further configured to send the terminal side measurement information based on the positioning node reference signal and the base station side measurement information based on the positioning node reference signal to the location server, wherein the terminal side measurement information and the base station side measurement information are for the location server to calculate location information of the target terminal.

2. The base station according to claim 1, wherein the processor is further configured to:
before the transmitter sends the terminal side measurement request based on the positioning node reference signal to the target terminal according to the configuration information of the positioning node reference signal, determine whether the positioning node reference signal has been configured for the target terminal; and
in response to determining that the processor has configured the positioning node reference signal for the target terminal, the transmitter is configured to send the terminal side measurement request based on the positioning node reference signal to the target terminal according to the configuration information of the configured positioning node reference signal; or
in response to determining that the processor has not configured the positioning node reference signal for the target terminal, the transmitter is further configured to:
send the configuration information of the positioning node reference signal to the target terminal; and
send the terminal side measurement request based on the positioning node reference signal to the target terminal according to the configuration information that is of the positioning node reference signal and sent to the target terminal.

3. The base station according to claim 1, wherein the processor is further configured to determine, after the receiver receives the location measurement request from the location server, that the target terminal is in the scenario in which a plurality of positioning nodes shares the same cell identity.

4. The base station according to claim 1, wherein the terminal side measurement information based on the positioning node reference signal comprises the cell identity, the positioning node identity or positioning node reference signal identity, and a terminal side reception-transmission time difference corresponding to the positioning node identity or positioning node reference signal identity; and
the base station side measurement information based on the positioning node reference signal comprises the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

5. The base station according to claim 1, wherein the positioning node reference signal is a channel state information-reference signal (CSI-RS).

6. A device the device comprising:
a receiver, configured to receive a terminal side measurement request that is based on a positioning node reference signal and from a positioning apparatus according to configuration information of the positioning node reference signal, wherein the device is in a scenario in which a plurality of positioning nodes shares a same cell identity, wherein the configuration information of the positioning node reference signal comprises a transmission timing of the positioning node reference signal, a transmission period of the positioning node reference signal, and a frequency-domain transmission position of the positioning node reference signal, and wherein the positioning node reference signal further comprises a positioning node identity or a positioning node reference signal identity;
a processor, configured to perform, according to the terminal side measurement request, a terminal side measurement based on the positioning node reference signal; and
a transmitter, configured to send terminal side measurement information based on the positioning node reference signal to the positioning apparatus.

7. The device according to claim 6, wherein the positioning apparatus is a serving base station, and the receiver is further configured to:
receive the configuration information that is of the positioning node reference signal and from the serving base station.

8. The device according to claim 6, wherein the positioning apparatus is a location server.

9. The device according to claim 6, wherein the terminal side measurement information based on the positioning node reference signal comprises a cell identity, the positioning node identity or positioning node reference signal identity, and a terminal side reception-transmission time difference corresponding to the positioning node identity or positioning node reference signal identity.

10. The device according to claim 6, wherein the positioning node reference signal is a channel state information-reference signal (CSI-RS).

11. A location server for positioning a terminal, the location server comprising:
a transmitter, configured to send a base station side measurement request based on a positioning node reference signal to a serving base station of a target according to configuration information of the positioning node reference signal, and send a terminal side measurement request based on the positioning node reference signal to the target terminal, wherein the terminal is in a scenario in which a plurality of positioning nodes shares a same cell identity, wherein the configuration information of the positioning node reference signal comprises a transmission timing of the positioning node reference signal, a transmission period of the positioning node reference signal, and a frequency-domain transmission position of the positioning node reference signal, and wherein the positioning node reference signal further comprises a positioning node identity or a positioning node reference signal identity;
a receiver, configured to receive base station side measurement information based on the positioning node reference signal and sent by the serving base station, and receive terminal side measurement information based on the positioning node reference signal and sent by the target terminal; and
a processor, configured to calculate location information of the target according to the base station side measurement information based on the positioning node reference signal and the terminal side measurement information based on the positioning node reference signal.

12. The location server according to claim 11, wherein the transmitter is further configured to:
before sending the base station side measurement request based on the positioning node reference signal to the serving base station of the target terminal, send a request for the configuration information of the positioning node reference signal to the serving base station; and wherein the receiver is further configured to:
receive the configuration information that is of the positioning node reference signal of the target terminal and from the serving base station.

13. The location server according to claim 11, wherein the transmitter is further configured to:
send, to the serving base station, a query request used to confirm whether a plurality of positioning nodes shares a same cell identity within coverage of the serving base station; and
the receiver is further configured to receive confirmation information sent by the serving base station and used to indicate that the same cell identity is shared by the plurality of positioning nodes within the coverage of the serving base station.

14. The location server according to claim 11, wherein the terminal side measurement information based on the positioning node reference signal comprises the cell identity, the positioning node identity or positioning node reference signal identity, and a terminal side reception-transmission time difference corresponding to the positioning node identity or positioning node reference signal identity; and
the base station side measurement information based on the positioning node reference signal comprises the cell identity, the positioning node identity or positioning node reference signal identity, and a base station side reception-transmission time difference corresponding to the positioning node identity or positioning node reference signal identity, or, the cell identity, the positioning node identity or positioning node reference signal identity, a base station side reception-transmission time difference corresponding to the positioning node identity or positioning node reference signal identity, and an angle of arrival of a received signal transmitted by the target terminal.

15. The location server according to claim 11, wherein the positioning node reference signal is a channel state information-reference signal (CSI-RS).

16. The base station according to claim 1, wherein the configuration information of the positioning node reference signal further comprises antenna port information.

17. The device according to claim 6, wherein the configuration information of the positioning node reference signal further comprises antenna port information.

18. The location server according to claim 11, wherein the configuration information of the positioning node reference signal further comprises antenna port information.

* * * * *

UNITED STATES PATENT AND TRADEMARK OFFICE
CERTIFICATE OF CORRECTION

| | | |
|---|---|---|
| PATENT NO. | : 10,075,934 B2 | Page 1 of 1 |
| APPLICATION NO. | : 15/267932 | |
| DATED | : September 11, 2018 | |
| INVENTOR(S) | : Jie Cui et al. | |

It is certified that error appears in the above-identified patent and that said Letters Patent is hereby corrected as shown below:

In the Claims

Claim 11, Column 53, Line 10, "target" should read -- target terminal --.

Claim 11, Column 53, Line 34, "target" should read -- target terminal --.

Signed and Sealed this
Third Day of September, 2019

Andrei Iancu
*Director of the United States Patent and Trademark Office*